US00RE46763E

(19) United States
(12) Reissued Patent
Saito

(10) Patent Number: US RE46,763 E
(45) Date of Reissued Patent: Mar. 27, 2018

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Masayuki Saito, Ichihara (JP)

(73) Assignees: JNC CORPORATION, Tokyo (JP); JNC PETROCHEMICAL CORPORATION, Tokyo (JP)

(21) Appl. No.: 14/879,713

(22) Filed: Oct. 9, 2015

Related U.S. Patent Documents

Reissue of:
(64) Patent No.: 8,535,768
Issued: Sep. 17, 2013
Appl. No.: 13/145,791
PCT Filed: Jan. 15, 2010
PCT No.: PCT/JP2010/050374
§ 371 (c)(1),
(2) Date: Jul. 22, 2011
PCT Pub. No.: WO2010/084823
PCT Pub. Date: Jul. 29, 2010

(30) Foreign Application Priority Data

Jan. 22, 2009 (JP) ..... 2009-011507
Aug. 4, 2009 (JP) ..... 2009-181775

(51) Int. Cl.

| | |
|---|---|
| ***C09K 19/30*** | (2006.01) |
| ***C09K 19/32*** | (2006.01) |
| ***C09K 19/34*** | (2006.01) |
| ***C09K 19/12*** | (2006.01) |
| ***C09K 19/20*** | (2006.01) |
| ***C09K 19/06*** | (2006.01) |
| ***C09K 19/42*** | (2006.01) |
| ***C09K 19/44*** | (2006.01) |
| ***C09K 19/46*** | (2006.01) |
| *C09K 19/04* | (2006.01) |

(52) U.S. Cl.
CPC ..... *C09K 19/3001* (2013.01); *C09K 19/062* (2013.01); *C09K 19/12* (2013.01); *C09K 19/3402* (2013.01); *C09K 19/42* (2013.01); *C09K 19/44* (2013.01); *C09K 19/46* (2013.01); *C09K 2019/0407* (2013.01); *C09K 2019/0448* (2013.01); *C09K 2019/122* (2013.01); *C09K 2019/123* (2013.01); *C09K 2019/301* (2013.01); *C09K 2019/3004* (2013.01); *C09K 2019/3009* (2013.01); *C09K 2019/3015* (2013.01); *C09K 2019/3016* (2013.01); *C09K 2019/3021* (2013.01); *C09K 2019/3025* (2013.01); *C09K 2019/3078* (2013.01); *C09K 2019/3422* (2013.01); *C09K 2019/3425* (2013.01); *Y10T 428/10* (2015.01)

(58) Field of Classification Search
CPC .. C09K 19/12; C09K 19/3402; C09K 19/062; C09K 19/42; C09K 19/44; C09K 19/46; C09K 19/3001
See application file for complete search history.

(56) References Cited

U.S. PATENT DOCUMENTS

| | | | | |
|---|---|---|---|---|
| 6,066,268 | A | 5/2000 | Ichinose et al. | |
| 6,861,107 | B2 * | 3/2005 | Klasen-Memmer et al. | 428/1.1 |
| 6,896,939 | B2 * | 5/2005 | Klasen-Memmer et al. | 428/1.1 |
| 7,731,865 | B2 * | 6/2010 | Bernatz et al. | 252/299.01 |
| 7,807,068 | B2 * | 10/2010 | Bremer et al. | 252/299.01 |
| 8,168,081 | B2 * | 5/2012 | Klasen-Memmer et al. | 252/299.6 |
| 2003/0077405 | A1 | 4/2003 | Miyazawa et al. | |
| 2003/0085377 | A1 | 5/2003 | Dunn et al. | |
| 2003/0222245 | A1 | 12/2003 | Klasen-Memmer et al. | |
| 2004/0011996 | A1 | 1/2004 | Klasen-Memmer et al. | |
| 2005/0116200 | A1 | 6/2005 | Nakanishi et al. | |
| 2008/0011984 | A1 | 1/2008 | Fujita et al. | |
| 2009/0103011 | A1 | 4/2009 | Bernatz et al. | |
| 2009/0141215 | A1 * | 6/2009 | Bremer et al. | 349/86 |
| 2009/0309066 | A1 * | 12/2009 | Klasen-Memmer et al. | 252/299.61 |
| 2010/0134751 | A1 | 6/2010 | Klasen-Memmer et al. | |

(Continued)

FOREIGN PATENT DOCUMENTS

| | | |
|---|---|---|
| EP | 0969071 | 1/2000 |
| EP | 0969071 A1 | 1/2000 |

(Continued)

OTHER PUBLICATIONS

Decision of the Invalidity Trial, Patent No. 201080005115.X, dated Aug. 13, 2015.

*Primary Examiner* — Alan Diamond
(74) *Attorney, Agent, or Firm* — Hogan Lovells US LLP

(57) ABSTRACT

Described is a liquid crystal composition which satisfies at least one of such characteristics as high upper limit temperature of the nematic phase, low lower limit temperature of the nematic phase, low viscosity, adequate optical anisotropy, large negative dielectric anisotropy, high resistivity, high stability to ultraviolet light and high stability to heat, or which has an adequate balance between at least two of the above-mentioned characteristics. Also described is an AM element having a short response time, high voltage holding ratio, high contrast ratio, long life and the like. The liquid crystal composition contains a specific compound having a large negative dielectric anisotropy and a low lower limit temperature as a first component, a specific compound having a low viscosity or a high upper limit temperature as a second component, and a specific compound having a polymerizable group as a third component. The AM element contains the composition.

14 Claims, No Drawings

(56) References Cited

U.S. PATENT DOCUMENTS

| | | | |
|---|---|---|---|
| 2010/0302491 | A1 | 12/2010 | Usui et al. |
| 2011/0248216 | A1 | 10/2011 | Klasen-Memmer et al. |
| 2011/0255048 | A1 | 10/2011 | Goetz et al. |

FOREIGN PATENT DOCUMENTS

| | | | | |
|---|---|---|---|---|
| EP | 1889894 | | | 2/2008 |
| EP | 1889894 | A1 | | 2/2008 |
| JP | 07101904 | A | * | 4/1995 |
| JP | H07101904 | A | | 4/1995 |
| JP | H11-140447 | A | | 5/1999 |
| JP | 2000053602 | A | | 2/2000 |
| JP | 2000-256307 | | | 9/2000 |
| JP | 2000256307 | A | | 9/2000 |
| JP | 2001-019965 | | | 1/2001 |
| JP | 2001019965 | A | | 1/2001 |
| JP | 2002371026 | A | | 12/2002 |
| JP | 2003105030 | A | | 4/2003 |
| JP | 2003307720 | A | | 10/2003 |
| JP | 2003327965 | A | | 11/2003 |
| JP | 2004131704 | A | | 4/2004 |
| JP | 2006-133619 | | | 5/2006 |
| JP | 2006133619 | A | | 5/2006 |
| JP | 2008031432 | A | | 2/2008 |
| JP | 2008285570 | A | | 11/2008 |
| JP | 2008308581 | A | | 12/2008 |
| JP | 2009504814 | A | | 2/2009 |
| JP | 2009102639 | A | | 5/2009 |
| JP | 2012513482 | A | | 6/2012 |
| JP | 2012513483 | A | | 6/2012 |
| WO | 2009050869 | A1 | | 4/2009 |

* cited by examiner

LIQUID CRYSTAL COMPOSITION AND LIQUID CRYSTAL DISPLAY DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This [application claims] *is a reissue application of U.S. Pat. No. 8,535,768, which issued on Sep. 17, 2013, which was filed as U.S. application Ser. No. 13/145,791 on Jul. 22, 2011, which claimed* the priority benefit of the International Patent Application No. PCT/JP2010/050374 filed on Jan. 15, 2010, which claims the priority benefit of Japan application no. 2009-011507, filed on Jan. 22, 2009 and the priority benefit of Japan application no. 2009-181775 filed on Aug. 4, 2009. The entirety of the above-mentioned patent applications is hereby incorporated by reference herein and made a part of this specification.

TECHNICAL FIELD

The invention relates to a liquid crystal composition mainly suitable for use in an active matrix (AM) device and so forth, and an AM device and so forth containing the composition. More specifically, the invention relates to a liquid crystal composition having a negative dielectric anisotropy, and a device that contains the composition and has a mode such as an in-plane switching (IPS) mode, a vertical alignment (VA) mode or a polymer sustained alignment (PSA) mode.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) and a polymer sustained alignment (PSA) mode. A classification based on a driving mode in the device includes a passive matrix (PM) and an active matrix (AM). The PM is further classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing a natural light, a transmissive type utilizing a backlight and a transreflective type utilizing both the natural light and the backlight.

The device contains a liquid crystal composition having suitable characteristics. The liquid crystal composition has a nematic phase. General characteristics of the composition should be improved to obtain an AM device having good general characteristics. Table 1 below summarizes a relationship between two of the general characteristics. The general characteristics of the composition will be explained further based on a commercially available AM device. A temperature range of the nematic phase relates to a temperature range in which the device can be used. A preferred maximum temperature of the nematic phase is 70° C. or higher and a preferred minimum temperature of the nematic phase is 10° C. or lower. A viscosity of the composition relates to a response time in the device. A short response time is preferred for displaying moving images on the device. Accordingly, a small viscosity in the composition is preferred. A small viscosity at a low temperature is further preferred.

TABLE 1

General Characteristics of Composition and AM Device

| No. | General Characteristics of Composition | General Characteristics of AM Device |
|---|---|---|
| 1 | wide temperature range of a nematic phase | wide usable temperature range |
| 2 | small viscosity[1)] | short response time |
| 3 | suitable optical anisotropy | large contrast ratio |
| 4 | large positive or negative dielectric anisotropy | low threshold voltage and small electric power consumption large contrast ratio |
| 5 | large specific resistance | large voltage holding ratio and large contrast ratio |
| 6 | high stability to ultraviolet light and heat | long service life |

[1)]A liquid crystal composition can be injected into a liquid crystal cell in a shorter period of time.

An optical anisotropy of the composition relates to a contrast ratio in the device. A product ($\Delta n \times d$) of the optical anisotropy ($\Delta n$) of the composition and a cell gap (d) in the device is designed so as to maximize the contrast ratio. A suitable value of the product depends on a type of the operating mode. The suitable value is in the range of 0.30 micrometer to 0.40 micrometer in a device having the VA mode or the PSA mode, and in the range of 0.20 micrometer to 0.30 micrometer in a device having the IPS mode. In the above case, a composition having a large optical anisotropy is preferred for a device having a small cell gap. A large absolute value of a dielectric anisotropy in the composition contributes to a low threshold voltage, a small electric power consumption and a large contrast ratio in the device. Accordingly, the large absolute value of the dielectric anisotropy is preferred. A large specific resistance in the composition contributes to a large voltage holding ratio and a large contrast ratio in the device. Accordingly, a composition having a large specific resistance, at room temperature and also at a high temperature in an initial stage, is preferred. A composition having a large specific resistance, at room temperature and also at a high temperature after using the device for a long time, is preferred. Stability of the composition to ultraviolet light and heat relates to a service life of the liquid crystal display device. In the case where the stability is high, the device has a long service life. Such characteristics are preferred for an AM device used in a liquid crystal projector, a liquid crystal television and so forth.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode. A composition having a positive or negative dielectric anisotropy is used for an AM device having the PSA mode. Examples of the liquid crystal composition having the negative dielectric anisotropy are disclosed in the following patent literatures No. 1 to No. 4.

CITATION LIST

Patent Literature

Patent literature No. 1: JP-A-2003-307720.
Patent literature No. 2: JP-A-2004-131704.
Patent literature No. 3: JP-A-2006-133619.
Patent literature No. 4: EP-A-1889894.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large positive or negative dielectric anisotropy, a large specific resistance, a high stability to ultraviolet light and a high stability to heat.

SUMMARY OF INVENTION

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. Another aim 1s to provide a liquid crystal composition having a suitable balance regarding at least two of the characteristics. A further aim is to provide a liquid crystal display device containing such a composition. An additional aim 1s to provide a composition having a suitable optical anisotropy to be a small optical anisotropy or a large optical anisotropy, a large negative dielectric anisotropy, a high stability to ultraviolet light and so forth, and is to provide an AM device having a short response time, a large voltage holding ratio, a large contrast ratio, a long service life and so forth.

Solution to Problem

The invention concerns a liquid crystal composition containing at least one compound selected from the group of compounds represented by formula (1) as a first component, at least one compound selected from the group of compounds represented by formula (2) as a second component and at least one compound selected from the group of compounds represented by formula (3) as a third component, and concerns a liquid crystal display device containing the composition:

(1)

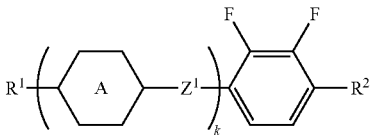

-continued (2)

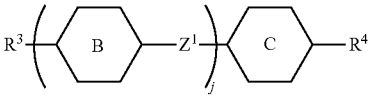

(3)

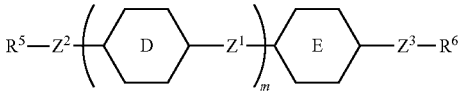

wherein $R^1$, $R^2$, $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; $R^5$ and $R^6$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, acrylate, methacrylate, vinyloxy, propenylether, oxirane, oxetane or vinylketone, and at least one of $R^5$ and $R^6$ is acrylate, methacrylate, vinyloxy, propenylether, oxirane, oxetane or vinylketone; ring A is independently 1,4-cyclohexylene or 1,4-phenylene; ring B and ring C are independently 1,4-cyclohexylene, 1,4-phenylene, 2-fluoro-1,4-phenylene, 3-fluoro-1,4-phenylene or 2,5-difluoro-1,4-phenylene; ring D and ring E are independently 1,4-cyclohexylene, 1,4-phenylene, 2-fluoro-1,4-phenylene, 3-fluoro-1,4-phenylene, 2,3-difluoro-1,4-phenylene, 2,5-difluoro-1,4-phenylene, 3,5-difluoro-1,4-phenylene, 2-methyl-1,4-phenylene, 3-methyl-1,4-phenylene or 2,6-naphthalene; $Z^1$ is independently a single bond, ethylene, methyleneoxy or carbonyloxy; $Z^2$ and $Z^3$ are independently a single bond, alkylene having 1 to 12 carbons, or alkylene having 1 to 12 carbons in which arbitrary —$CH_2$— is replaced by —O—; k and j are independently 1, 2 or 3; and m is 0, 1 or 2.

Advantegeous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat. One aspect of the invention is a liquid crystal composition having a suitable balance regarding at least two of the characteristics. Another aspect is a liquid crystal display device containing such a composition. A further aspect is a composition having a suitable optical anisotropy, a large negative dielectric anisotropy, a high stability to ultraviolet light and so forth, and is an AM device having a short response time, a large voltage holding ratio, a large contrast ratio, a long service life and so forth.

DESCRIPTION OF EMBODIMENTS

Usage of terms in the specification and claims is as described below. A liquid crystal composition or a liquid crystal display device of the invention may be abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound and a polymerizable compound may occasionally be added to the composition. Even in the case where the compound is liquid crystalline, the compound is classified as an additive herein. At least one compound selected from the group of compounds represented by formula (1) may be abbreviated as "compound (1)." "Compound (1)" means one compound or two or more compounds represented by formula (1). A same rule applies to any other compound represented by any other formula. A term "arbitrary" is used not only in the case where a position is arbitrary but also in the case where the number is arbitrary. However, the term is not used in the case where the number is 0 (zero).

A higher limit of a temperature range of the nematic phase may be abbreviated as "maximum temperature." A lower limit of the temperature range of the nematic phase may be abbreviated as "minimum temperature." An expression "a specific resistance is large" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after using the device for a long time. An expression "a voltage holding ratio is large" means that the device has a large voltage holding ratio at room temperature and also at a high temperature in an initial stage, and that the device has a large voltage holding ratio at room temperature and also at a temperature close to the maximum temperature of the nematic phase even after using the device for a long time. When characteristics such as an optical anisotropy are explained, values obtained according to the measuring methods described in Examples will be used. A first component includes one compound or two or more compounds. A term "a ratio of the first component" is expressed as weight percent (% by weight) of the first component based on the weight of the liquid crystal composition excluding a third component. A same rule applies to a ratio of the second component and so forth. A ratio of the additive mixed with the composition is expressed as weight percent (% by weight) or weight parts per million (ppm) based on the total weight of the liquid crystal composition.

A symbol $R^1$ is used for a plurality of compounds in chemical formulas of component compounds. Meaning of $R^1$ may be identical or different in two arbitrary compounds among a plurality of the compounds. In one case, for example, $R^1$ of compound (1-1) is ethyl and $R^1$ of compound (1-2) is ethyl. In another case, $R^1$ of compound (1-1) is ethyl and $R^1$ of compound (1-2) is propyl. A same rule applies to a symbol $R^2$, $Z^1$ or the like.

The invention includes the items described below.

Item 1. A liquid crystal composition that has a negative dielectric anisotropy and contains at least one compound selected from the group of compounds represented by formula (1) as a first component, at least one compound selected from the group of compounds represented by formula (2) as a second component and at least one compound selected from the group of compounds represented by formula (3) as a third component:

(1)

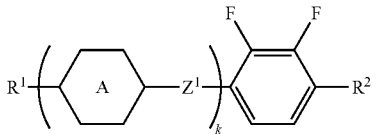

(2)

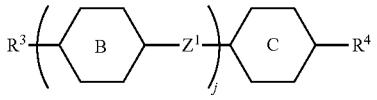

(3)

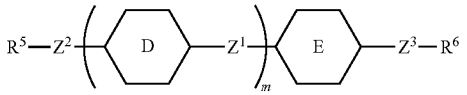

wherein $R^1$, $R^2$, $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; $R^5$ and $R^6$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, acrylate, methacrylate, vinyloxy, propenylether, oxirane, oxetane or vinylketone, and at least one of $R^5$ and $R^6$ is acrylate, methacrylate, vinyloxy, propenylether, oxirane, oxetane or vinylketone; ring A is independently 1,4-cyclohexylene or 1,4-phenylene; ring B and ring C are independently 1,4-cyclohexylene, 1,4-phenylene, 2-fluoro-1,4-phenylene, 3-fluoro-1,4-phenylene or 2,5-difluoro-1,4-phenylene; ring D and ring E are independently 1,4-cyclohexylene, 1,4-phenylene, 2-fluoro-1,4-phenylene, 3-fluoro-1,4-phenylene, 2,3-difluoro-1,4-phenylene, 2,5-difluoro-1,4-phenylene, 3,5-difluoro-1,4-phenylene, 2-methyl-1,4-phenylene, 3-methyl-1,4-phenylene or 2,6-naphthalene; $Z^1$ is independently a single bond, ethylene, methyleneoxy or carbonyloxy; $Z^2$ and $Z^3$ are independently a single bond, alkylene having 1 to 12 carbons, or alkylene having 1 to 12 carbons in which arbitrary —$CH_2$— is replaced by —O—; k and j are independently 1, 2 or 3; and m is 0, 1 or 2.

Item 2. The liquid crystal composition according to item 1, wherein the first component is at least one compound selected from the group of compounds represented by formula (1-1) to formula (1-7):

(1-1)

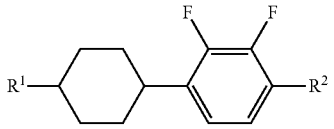

(1-2)

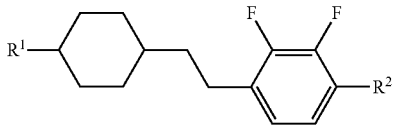

(1-3)

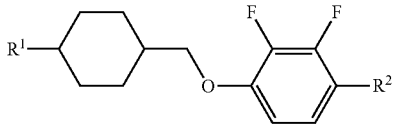

-continued (1-4)

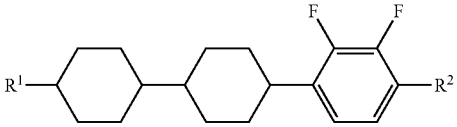

(1-5)

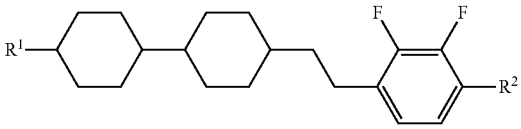

(1-6)

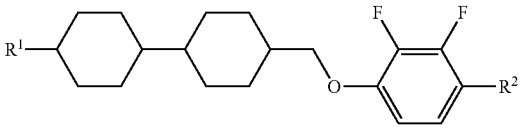

(1-7)

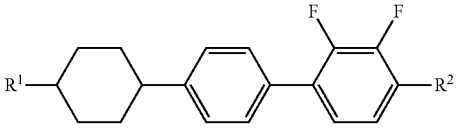

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

Item 3. The liquid crystal composition according to item 2, wherein the first component is at least one compound selected from the group of compounds represented by formula (1-1).

Item 4. The liquid crystal composition according to item 2, wherein the first component is at least one compound selected from the group of compounds represented by formula (1-4).

Item 5. The liquid crystal composition according to item 2, wherein the first component is at least one compound selected from the group of compounds represented by formula (1-7).

Item 6. The liquid crystal composition according to item 2, wherein the first component is a mixture of at least one compound selected from the group of compounds represented by formula (1-1) and at least one compound selected from the group of compounds represented by formula (1-4).

Item 7. The liquid crystal composition according to item 2, wherein the first component is a mixture of at least one compound selected from the group of compounds represented by formula (1-1) and at least one compound selected from the group of compounds represented by formula (1-7).

Item 8. The liquid crystal composition according to item 2, wherein the first component is a mixture of at least one compound selected from the group of compounds represented by formula (1-1), at least one compound selected from the group of compounds represented by formula (1-4) and at least one compound selected from the group of compounds represented by formula (1-7).

Item 9. The liquid crystal composition according to item 1, wherein the second component is at least one compound selected from the group of compounds represented by formula (2-1) to formula (2-12):

(2-1)

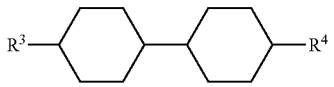

(2-2)

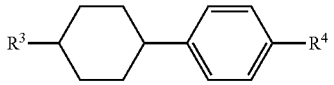

(2-3)

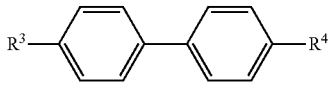

(2-4)

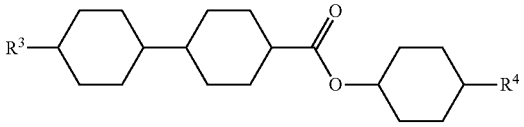

(2-5)

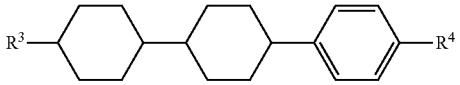

(2-6)

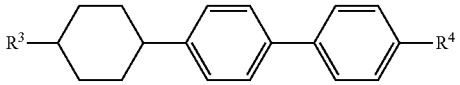

(2-7)

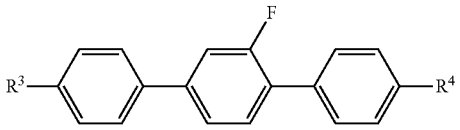

(2-8)

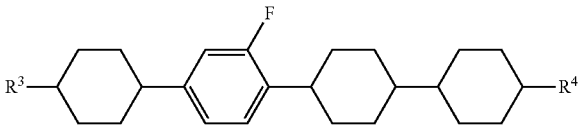

(2-9)

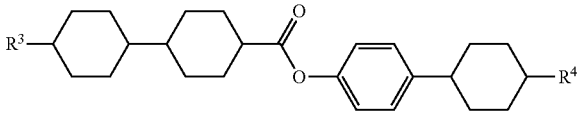

(2-10)

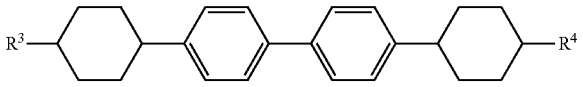

(2-11)

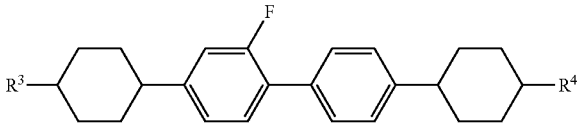

(2-12)

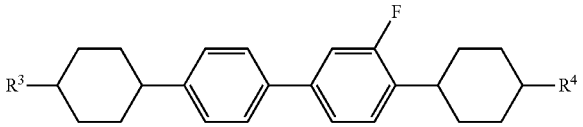

wherein $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

Item 10. The liquid crystal composition according to item 9, wherein the second component is at least one compound selected from the group of compounds represented by formula (2-1).

Item 11. The liquid crystal composition according to item 9, wherein the second component is a mixture of at least one compound selected from the group of compounds represented by formula (2-1) and at least one compound selected from the group of compounds represented by formula (2-5).

Item 12. The liquid crystal composition according to item 9, wherein the second component is a mixture of at least one compound selected from the group of compounds represented by formula (2-1) and at least one compound selected from the group of compounds represented by formula (2-7).

Item 13. The liquid crystal composition according to item 9, wherein the second component is a mixture of at least one compound selected from the group of compounds represented by formula (2-1), at least one compound selected from the group of compounds represented by formula (2-5) and at least one compound selected from the group of compounds represented by formula (2-7).

Item 14. The liquid crystal composition according to any one of items 1 to 13, wherein the third component is at least one compound selected from the group of compounds represented by formula (3-1) to formula (3-23):

(3-1)

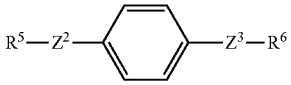

(3-2)

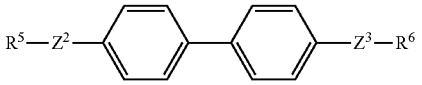

(3-3)

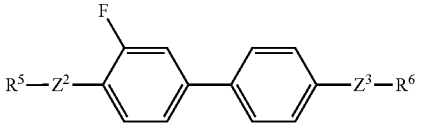

(3-4)

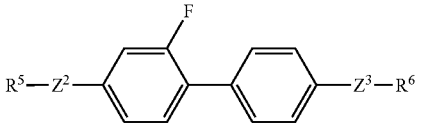

(3-5)

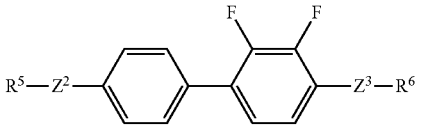

(3-6)

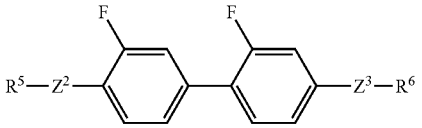

(3-7)

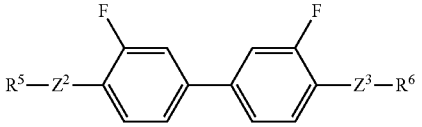

-continued (3-8)

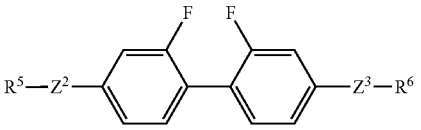

(3-9)

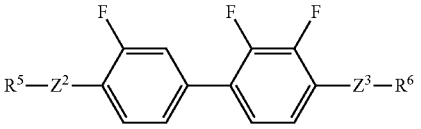

(3-10)

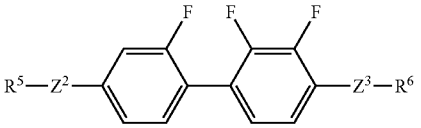

(3-11)

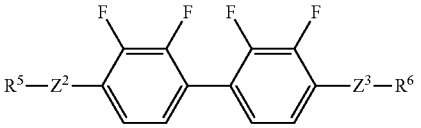

(3-12)

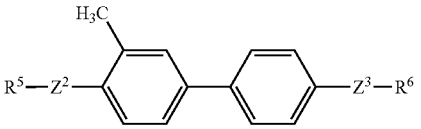

(3-13)

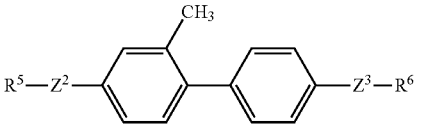

(3-14)

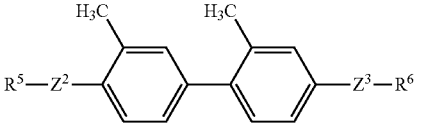

(3-15)

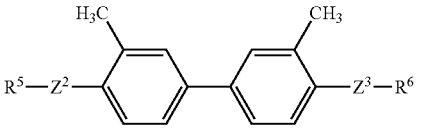

(3-16)

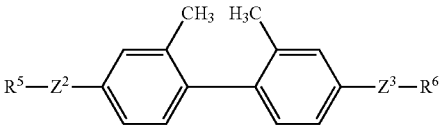

(3-17)

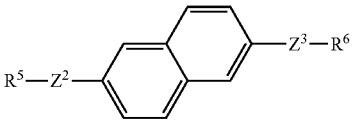

(3-18)

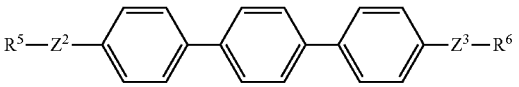

-continued (3-19)

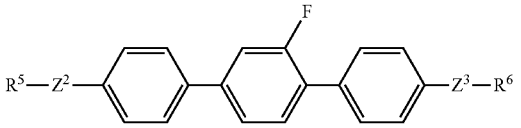

(3-20)

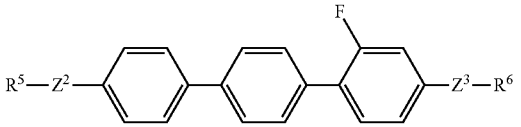

(3-21)

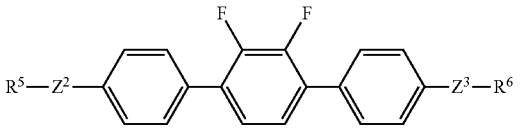

(3-22)

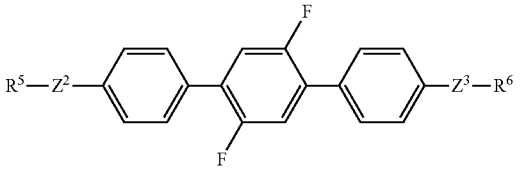

(3-23)

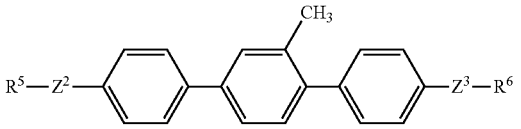

wherein $R^5$ and $R^6$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, acrylate, methacrylate, vinyloxy, propenylether, oxirane, oxetane or vinylketone, and at least one of $R^5$ and $R^6$ is acrylate, methacrylate, vinyloxy, propenylether, oxirane, oxetane or vinylketone; and $Z^2$ and $Z^3$ are independently a single bond, alkylene having 1 to 12 carbons, or alkylene having 1 to 12 carbons in which arbitrary —$CH_2$— is replaced by —O—.

Item 15. The liquid crystal composition according to item 14, wherein the third component is at least one compound selected from the group of compounds represented by formula (3-2).

Item 16. The liquid crystal composition according to item 14, wherein the third component is at least one compound selected from the group of compounds represented by formula (3-3).

Item 17. The liquid crystal composition according to item 14, wherein the third component is at least one compound selected from the group of compounds represented by formula (3-4).

Item 18. The liquid crystal composition according to item 14, wherein the third component is at least one compound selected from the group of compounds represented by formula (3-7).

Item 19. The liquid crystal composition according to item 14, wherein the third component is at least one compound selected from the group of compounds represented by formula (3-9).

Item 20. The liquid crystal composition according to item 14, wherein the third component is at least one compound selected from the group of compounds represented by formula (3-10).

Item 21. The liquid crystal composition according to any one of items 1 to 20, wherein a ratio of the first component is in the range of 10% by weight to 60% by weight, a ratio of the second component is in the range of 5% by weight to 50% by weight, based on the weight of the liquid crystal composition excluding the third component, and a ratio of the third component is in the range of 0.05 part by weight to 10 parts by weight, relative to 100 parts by weight of the liquid crystal composition excluding the third component.

Item 22. The liquid crystal composition according to any one of items 1 to 21, further containing at least one compound selected from the group of compounds represented by formula (4-1) to formula (4-3) as a fourth component:

(4-1)

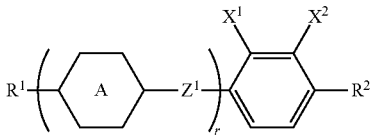

(4-2)

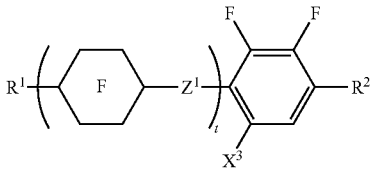

(4-3)

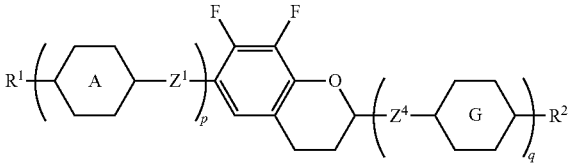

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring A and ring G are independently 1,4-cyclohexylene or 1,4-phenylene; ring F is independently tetrahydropyran-2,5-diyl, 1,4-cyclohexylene, 1,4-phenylene or 2,3-difluoro-1,4-phenylene; $Z^1$ and $Z^4$ are independently a single bond, ethylene, methyleneoxy or carbonyloxy; $X^1$ and $X^2$ are fluorine for either one or chlorine for the other one; $X^3$ is hydrogen or methyl, and when $X^3$ is hydrogen, at least one of ring F is tetrahydropyran-2,5-diyl or 2,3-difluoro-1,4-phenylene; r and t are independently 1, 2 or 3; and p and q are independently 0, 1, 2 or 3, and a sum of p and q is 3 or less.

Item 23. The liquid crystal composition according to item 22, wherein the fourth component is at least one compound selected from the group of compounds represented by formula (4-1-1) to formula (4-1-3), formula (4-2-1) to formula (4-2-15) and formula (4-3-1) to formula (4-3-4):

(4-1-1)
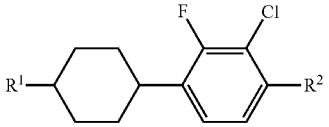
(4-1-2)
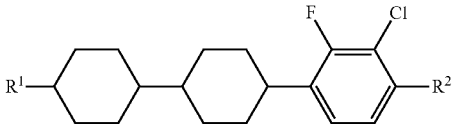
(4-1-3)
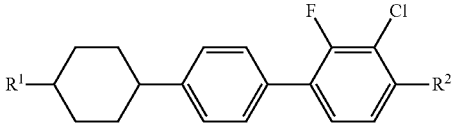
(4-2-1)
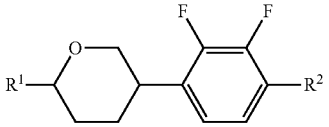
(4-2-2)
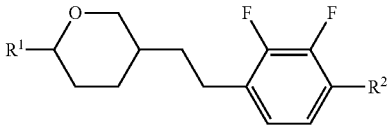
(4-2-3)
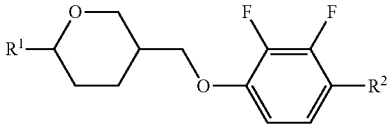
(4-2-4)
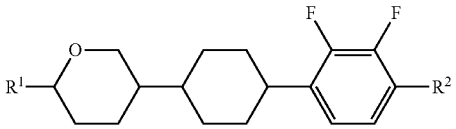
(4-2-5)
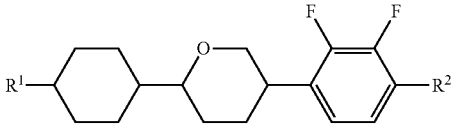
(4-2-6)
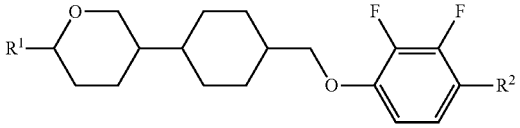
(4-2-7)
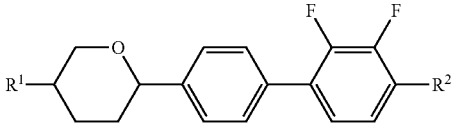
(4-2-8)
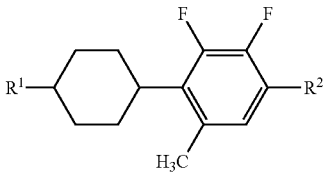
-continued
(4-2-9)
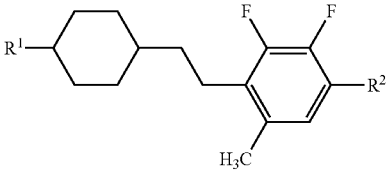
(4-2-10)
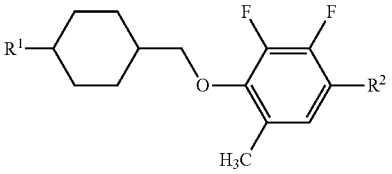
(4-2-11)
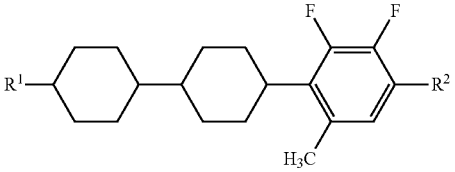
(4-2-12)
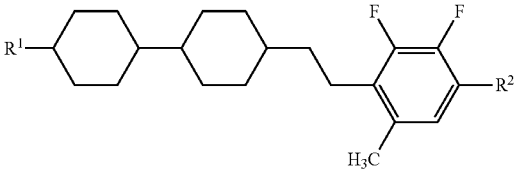
(4-2-13)
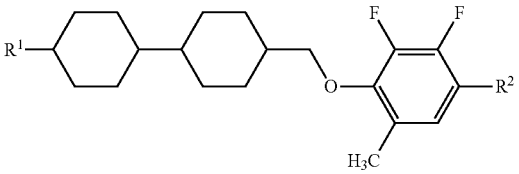
(4-2-14)
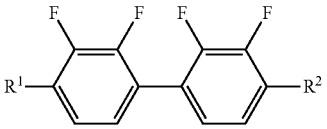
(4-2-15)
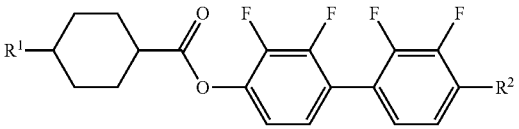
(4-3-1)
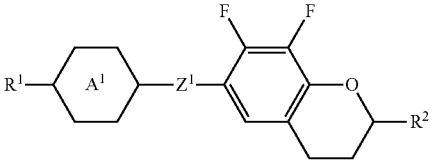
(4-3-2)
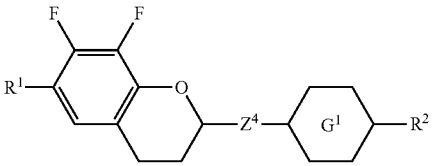

-continued (4-3-3)

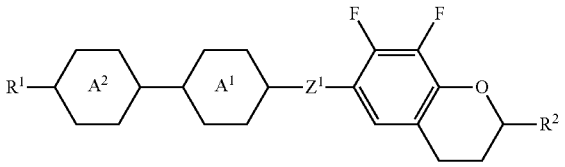

(4-3-4)

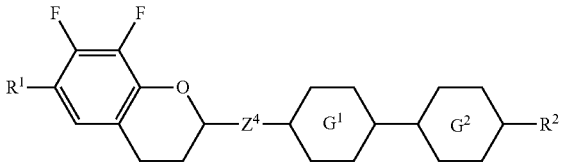

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring $A^1$, ring $A^2$, ring $G^1$ and ring $G^2$ are independently 1,4-cyclohexylene or 1,4-phenylene; and $Z^1$ and $Z^4$ are independently a single bond, ethylene, methyleneoxy or carbonyloxy.

Item 24. The liquid crystal composition according to item 23, wherein the fourth component is at least one compound selected from the group of compounds represented by formula (4-1-2).

Item 25. The liquid crystal composition according to item 23, wherein the fourth component is at least one compound selected from the group of compounds represented by formula (4-2-1).

Item 26. The liquid crystal composition according to item 23, wherein the fourth component is at least one compound selected from the group of compounds represented by formula (4-2-4).

Item 27. The liquid crystal composition according to item 23, wherein the fourth component is at least one compound selected from the group of compounds represented by formula (4-2-7).

Item 28. The liquid crystal composition according to item 23, wherein the fourth component is at least one compound selected from the group of compounds represented by formula (4-2-13).

Item 29. The liquid crystal composition according to item 23, wherein the fourth component is at least one compound selected from the group of compounds represented by formula (4-2-14).

Item 30. The liquid crystal composition according to any one of items 22 to 29, wherein a ratio of the fourth component is in the range of 5% by weight to 50% by weight, based on the weight of the liquid crystal composition excluding the third component.

Item 31. The liquid crystal composition according to any one of items 1 to 30, further containing a polymerization initiator.

Item 32. The liquid crystal composition according to any one of items 1 to 31, further containing a polymerization inhibitor.

Item 33. The liquid crystal composition according to any one of items 1 to 32, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.

Item 34. A liquid crystal display device, containing the liquid crystal composition according to any one of items 1 to 33.

Item 35. The liquid crystal display device according to item 34, wherein an operating mode in the liquid crystal display device is a VA mode, an IPS mode or a PSA mode, and a driving mode in the liquid crystal display device is an active matrix mode.

The invention further includes the following items: (1) the composition, further containing the optically active compound; (2) the composition, further containing the additive such as an antioxidant, an ultraviolet light absorber or an antifoaming agent; (3) an AM device containing the composition; (4) a device containing the composition, and having a TN, ECB, OCB, IPS, VA or PSA mode; (5) a transmissive device, containing the composition; (6) use of the composition as the composition having the nematic phase; and (7) use as an optically active composition prepared by addition of the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferred ratio of the component compounds and the basis thereof will be explained. Fourth, a preferred embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive and an impurity. "Any other liquid crystal compound" means a liquid crystal compound different from compound (1), compound (2), compound (3), compound (4-1), compound (4-2) and compound (4-3). Such a compound is mixed with the composition for the purpose of further adjusting the characteristics. Of any other liquid crystal compounds, a cyano compound is preferred to be small in view of stability to heat or ultraviolet light. A further preferred ratio of the cyano compound is 0% by weight. The additive includes the optically active compound, the antioxidant, the ultraviolet light absorber, a coloring matter, the antifoaming agent, the polymerizable compound and the polymerization initiator. The impurity includes a compound mixed in a process such as preparation of the component compounds. Even in the case where the compound is liquid crystalline, the compound is classified as the impurity herein.

Composition B consists essentially of compounds selected from the group of compound (1), compound (2), compound (3), compound (4-1), compound (4-2) and compound (4-3). A term "essentially" means that the composition may also contain the additive and the impurity, but does not contain any liquid crystal compound different from the compounds. Composition B has a smaller number of components than composition A has. Composition B is preferred to composition A in view of cost reduction. Composition A is preferred to composition Bin view of capability of further adjusting physical properties by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S are classified according to a qualitative comparison among the component compounds, and 0 (zero) means that "a value is nearly zero."

TABLE 2

Characteristics of Compounds

| | Compound | | |
|---|---|---|---|
| | Compound (1) | Compound (2) | Compound (4-1) Compound (4-2) Compound (4-3) |
| Maximum Temerature | S-L | S-L | S-L |
| Viscosity | M | S-M | M-L |
| Optical Anisotropy | M-L | S-L | M-L |
| Dielectric Anisotropy | S-L[1)] | 0 | M-L[1)] |
| Specific Resistance | L | L | L |

[1)]A value of the dielectric anisotropy is negative, and the symbol shows small and large of an absolute value.

Upon mixing the component compounds with the composition, the main effects of the component compounds on the characteristics of the composition are as described below. Compound (1) increases an absolute value of the dielectric anisotropy and decreases the minimum temperature. Compound (2) decreases the viscosity or increases the maximum temperature. Compound (4-1), compound (4-2) and compound (4-3) increase the absolute value of the dielectric anisotropy.

Third, the combination of the components in the composition, the preferred ratio of the component compounds and the basis thereof will be explained. The combination of the components in the composition includes a combination of the first component, the second component and the third component, and a combination of the first component, the second component, the third component and the fourth component.

A preferred ratio of the first component is 10% by weight or more for increasing the absolute value of the dielectric anisotropy, and 60% by weight or less for decreasing the minimum temperature. A further preferred ratio is in the range of 10% by weight to 55% by weight. A particularly preferred ratio is in the range of 15% by weight to 50% by weight.

A preferred ratio of the second component is 5% by weight or more for decreasing the viscosity or increasing the maximum temperature, and 50% by weight or less for increasing the absolute value of the dielectric anisotropy. A further preferred ratio is in the range of 10% by weight to 45% by weight. A particularly preferred ratio is in the range of 10% by weight to 40% by weight.

A preferred ratio of the third component is 0.05 part by weight or more for achieving the effect thereof, and 10 parts by weight or less for preventing a poor display, relative to 100 parts by weight of the liquid crystal composition excluding the third component. A further preferred ratio is in the range of 0.1 part by weight to 2 parts by weight.

A preferred ratio of the fourth component is 5% by weight or more for increasing the absolute value of the dielectric anisotropy, and 50% by weight or less for decreasing the viscosity. A further preferred ratio is in the range of 5% by weight to 45% by weight. A particularly preferred ratio is in the range of 5% by weight to 40% by weight.

Fourth, the preferred embodiment of the component compounds will be explained. $R^1$, $R^2$, $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine. Preferred $R^1$ or $R^2$ is alkyl having 1 to 12 carbons for increasing the stability to ultraviolet light or heat, or the like, or alkyoxy having 1 to 12 carbons for increasing the absolute value of the dielectric anisotropy. Preferred $R^3$ or $R^4$ is alkyl having 1 to 12 carbons for increasing the stability to ultraviolet light or heat, or the like, or alkenyl having 2 to 12 carbons for decreasing the minimum temperature. $R^5$ and $R^6$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, acrylate, methacrylate, vinyloxy, propenylether, oxirane, oxetane or vinylketone, and at least one of $R^5$ and $R^6$ is acrylate, methacrylate, vinyloxy, propenylether, oxirane, oxetane or vinylketone. Preferred $R^5$ or $R^6$ is acrylate or methacrylate.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. Cis preferred in the alkenyl such as 2-butenyl, 2-pentenyl and 2-hexenyl. In the alkenyl, straight-chain alkenyl is preferred to branched-chain alkenyl.

Preferred examples of alkenyl in which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl or 4,4-difluoro-3-butenyl for decreasing the viscosity.

Ring A and ring G are independently 1,4-cyclohexylene or 1,4-phenylene, and arbitrary two of ring A when k, r or p is 2 or 3 may be identical or different, and arbitrary two of ring G when q is 2 or 3 may be identical or different. Preferred ring A or ring G is 1,4-cyclohexylene for decreasing the viscosity. Ring B and ring C are independently 1,4-cyclohexylene, 1,4-phenylene, 2-fluoro-1,4-phenylene, 3-fluoro-1,4-phenylene or 2,5-difluoro-1,4-phenylene, and arbitrary two of ring B when j is 2 or 3 may be identical or different. Preferred ring B or ring C is 1,4-cyclohexylene for decreasing the viscosity. Ring D and ring E are independently 1,4-cyclohexylene, 1,4-phenylene, 2-fluoro-1,4-phenylene, 3 -fluoro-1,4-phenylene, 2,3-difluoro-1,4-phenylene, 2,5-difluoro-1,4-phenylene, 3,5-difluoro-1,4-phenylene, 2-methyl-1,4-phenylene, 3-methyl-1,4-phenylene or 2,6-naphthalene, and two of ring D when m is 2 may be identical or different. Preferred ring D or ring E is 1,4-phenylene for increasing the optical anisotropy. Ring F is tetrahydropyran-2,5-diyl, 1,4-cyclohexylene, 1,4-phenylene or 2,3-difluoro-1,4-phenylene, and arbitrary two of ring F when t is 2 or 3 may be identical or different. Preferred ring F is tetrahydropyran-2,5-diyl for increasing the absolute value of the dielectric anisotropy. Tetrahydropyran-2,5-diyl is:

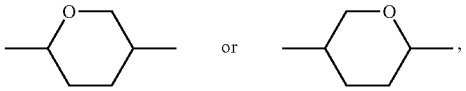

preferably,

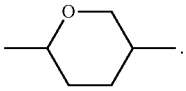

$Z^1$ and $Z^4$ are independently a single bond, ethylene, methyleneoxy or carbonyloxy, arbitrary two of $Z^1$ when k, j, r, t or p is 2 or 3 may be identical or different, two of $Z^1$ when m is 2 may be identical or different, and arbitrary two of $Z^4$ when q is 2 or 3 may be identical or different. Preferred $Z^1$ is a single bond for decreasing the viscosity, and methyleneoxy for increasing the absolute value of the dielectric anisotropy. Preferred $Z^4$ each is a single bond for decreasing the viscosity. $Z^2$ and $Z^3$ are independently a single bond, alkylene having 1 to 12 carbons, or alkylene having 1 to 12 carbons in which arbitrary —$CH_2$— is replaced by —O—. Preferred $Z^2$ or $Z^3$ is a single bond for decreasing the viscosity.

$X^1$ and $X^2$ are fluorine for either one or chlorine for the other one. As for preferred $X^1$ and $X^2$, $X^1$ is fluorine and $X^2$ is chlorine for decreasing the minimum temperature. $X^3$ is hydrogen or methyl, and when $X^3$ is hydrogen, at least one of ring F is tetrahydropyran-2,5-diyl or 2,3-difluoro-1,4-phenylene. Preferred $X^1$ is hydrogen for increasing the absolute value of the dielectric anisotropy.

Then, k, j, r and t are independently 1, 2 or 3. Preferred k is 1 for increasing the absolute value of the dielectric anisotropy. Preferred j is 1 for decreasing the viscosity. Preferred r and t each are 2 for decreasing the minimum temperature. Then m is 0, 1 or 2. Preferred m is 1 for decreasing the minimum temperature. Thus, p and q are independently 1, 2 or 3, and a sum of p and q is 3 or less. Preferred p is 2 for increasing the maximum temperature. Preferred q is 0 for decreasing the minimum temperature.

Fifth, the specific examples of the component compounds will be shown. In the preferred compounds described below, $R^7$ is straight-chain alkyl having 1 to 12 carbons or straight-chain alkoxy having 1 to 12 carbons. $R^8$ and $R^9$ are independently straight-chain alkyl having 1 to 12 carbons or straight-chain alkenyl having 2 to 12 carbons. $Z^2$ and $Z^3$ are independently a single bond, alkylene having 1 to 12 carbons, or alkylene having 1 to 12 carbons in which arbitrary —$CH_2$— is replaced by —O—. With regard to a configuration of 1,4-cyclohexylene in the compounds, trans is preferred to cis for increasing the maximum temperature. $R^{10}$ and $R^{11}$ are independently acrylate or methacrylate.

Preferred compound (1) includes compound (1-1-1) to compound (1-7-1). Further preferred compound (1) includes compound (1-1-1), compound (1-3-1), compound (1-4-1), compound (1-6-1) and compound (1-7-1). Particularly preferred compound (1) includes compound (1-1-1), compound (1-4-1) and compound (1-7-1). Preferred compound (2) includes compound (2-1-1) to compound (2-12-1). Further preferred compound (2) includes compound (2-1-1), compound (2-3-1), compound (2-5-1), compound (2-7-1), compound (2-8-1), compound (2-9-1) and compound (2-12-1). Particularly preferred compound (2) includes compound (2-1-1), compound (2-5-1), compound (2-7-1) and compound (2-12-1). Preferred compound (3) includes compound (3-1-1) to compound (3-23-1). Further preferred compound (3) includes compound (3-2-1), compound (3-3-1), compound (3-4-1), compound (3-5-1), compound (3-6-1), compound (3-7-1), compound (3-8-1), compound (3-9-1), compound (3-10-1), compound (3-11-1) and compound (3-19-1). Particularly preferred compound (3) includes compound (3-2-1), compound (3-6-1), compound (3-7-1), compound (3-8-1), compound (3-9-1) and compound (3-10-1). Preferred compound (4-1) includes compound (4-1-1-1) to compound (4-1-3-1). Further preferred compound (4-1) includes compound (4-1-2-1). Preferred compound (4-2) includes compound (4-2-1-1) to compound (4-2-15-1). Further preferred compound (4-2) includes compound (4-2-1-1), compound (4-2-3-1), compound (4-2-5-1), compound (4-2-6-1), compound (4-2-7-1), compound (4-2-13-1), compound (4-2-14-1) and compound (4-2-15-1). Particularly preferred compound (4-2) includes compound (4-2-1-1), compound (4-2-5-1) and compound (4-2-7-1). Preferred compound (4-3) includes compound (4-3-1-1) to compound (4-3-1-4), compound (4-3-2-1) to compound (4-3-2-2), compound (4-3-3-1) to compound (4-3-3-5) and compound (4-3-4-1) to compound (4-3-4-2). Further preferred compound (4-3) includes compound (4-3-1-1), compound (4-3-1-3), compound (4-3-3-1), compound (4-3-3-3) and compound (4-3-4-1). Particularly preferred compound (4-3) includes compound (4-3-1-3) and compound (1-1-1)

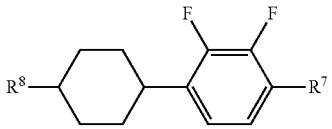

(1-2-1)

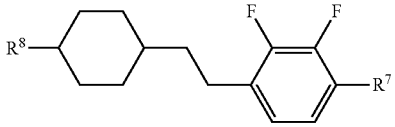

(1-3-1)

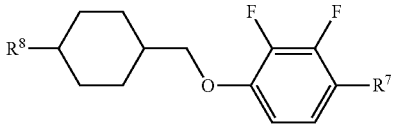

(1-4-1)

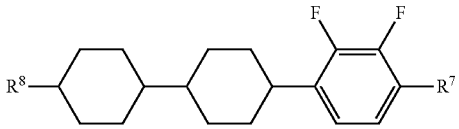

(1-5-1)

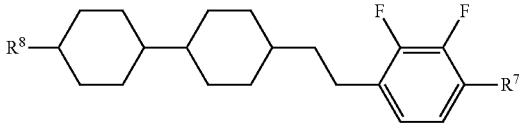

-continued
(1-6-1)
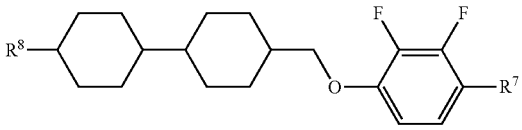
(1-7-1)
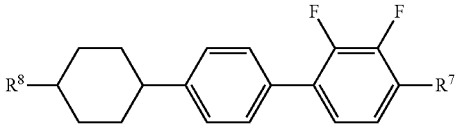
(2-1-1)
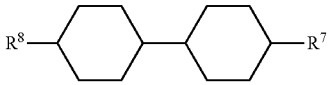
(2-2-1)
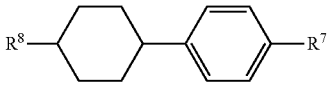
(2-3-1)
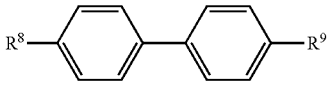
(2-4-1)
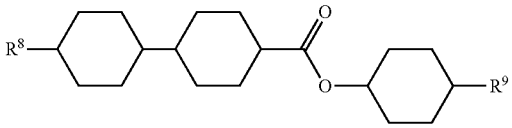
(2-5-1)
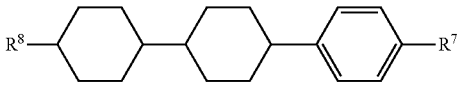
(2-6-1)
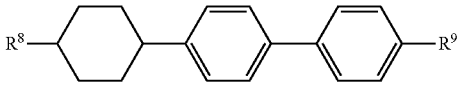
(2-7-1)
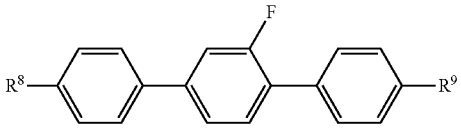
(2-8-1)
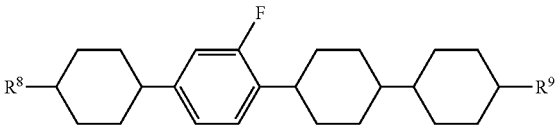
(2-9-1)
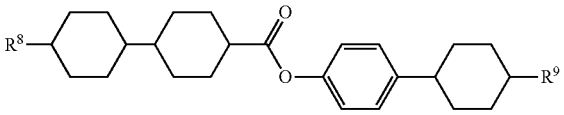
(2-10-1)
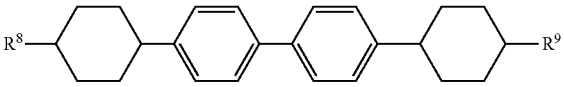
-continued
(2-11-1)
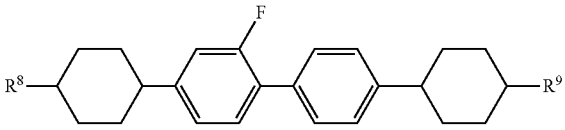
(2-12-1)
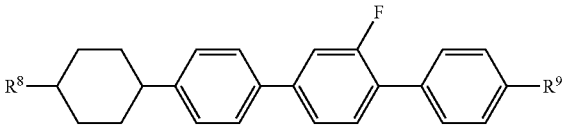
(3-1-1)
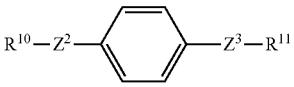
(3-2-1)
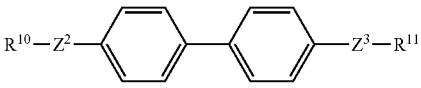
(3-3-1)
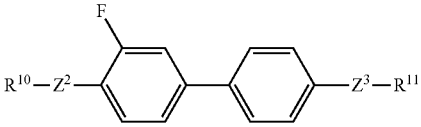
(3-4-1)
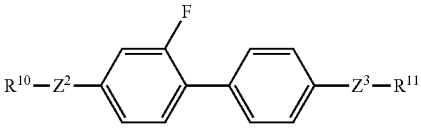
(3-5-1)
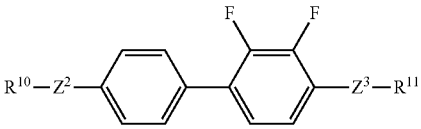
(3-6-1)
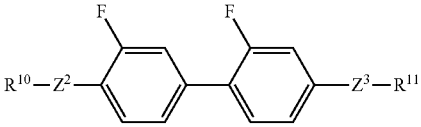
(3-7-1)
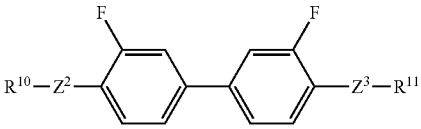
(3-8-1)
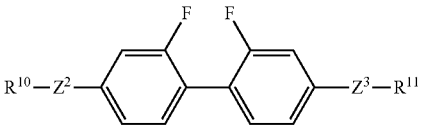
(3-9-1)
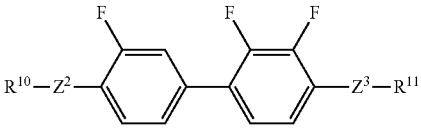

-continued
(3-10-1)
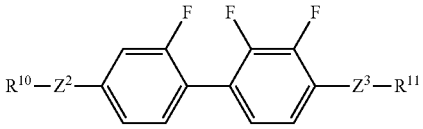
(3-11-1)
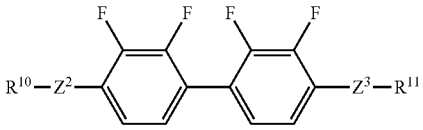
(3-12-1)
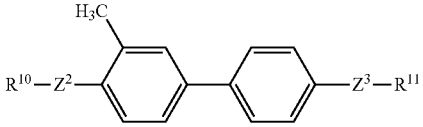
(3-13-1)
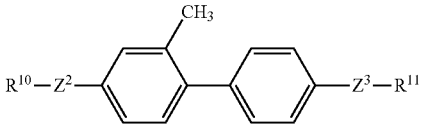
(3-14-1)
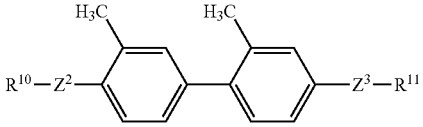
(3-15-1)
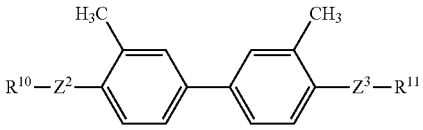
(3-16-1)
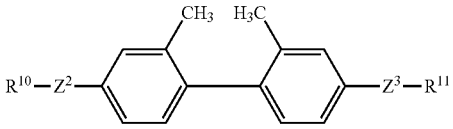
(3-17-1)
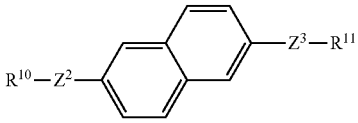
(3-18-1)
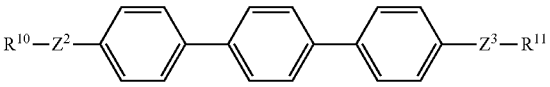
(3-19-1)
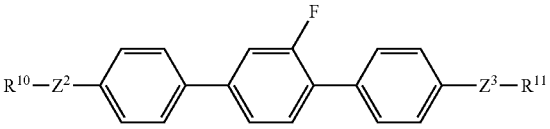
(3-20-1)
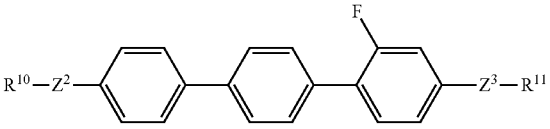
-continued
(3-21-1)
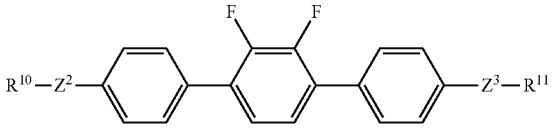
(3-22-1)
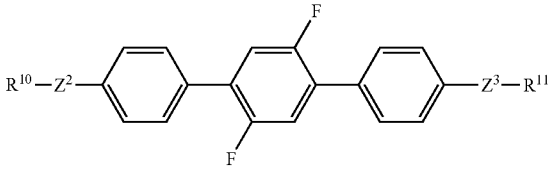
(3-23-1)
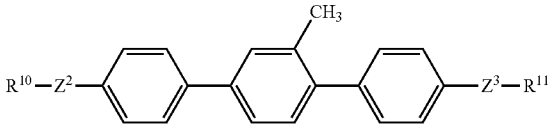
(4-1-1-1)
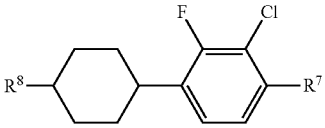
(4-1-2-1)
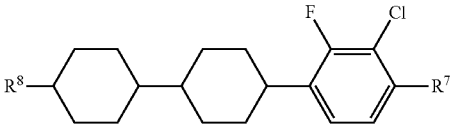
(4-1-3-1)
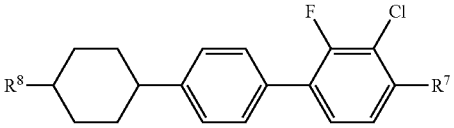
(4-2-1-1)
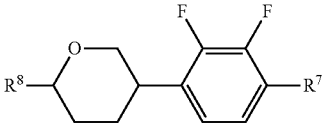
(4-2-2-1)
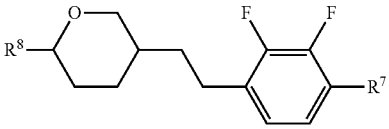
(4-2-3-1)
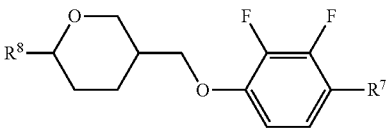
(4-2-4-1)
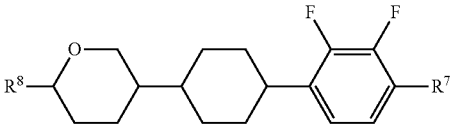

-continued
(4-2-5-1)
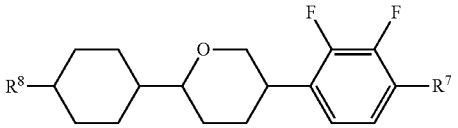
(4-2-6-1)
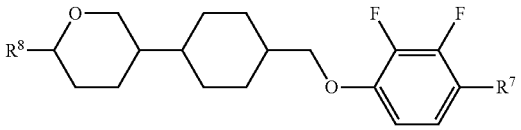
(4-2-7-1)
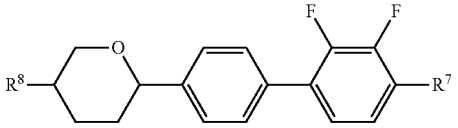
(4-2-8-1)
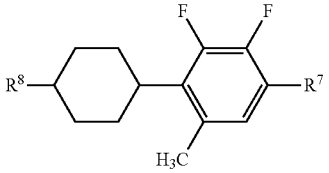
(4-2-9-1)
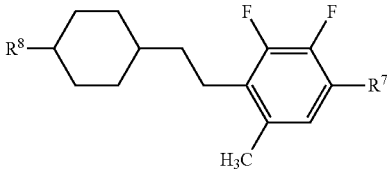
(4-2-10-1)
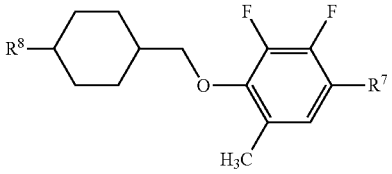
(4-2-11-1)
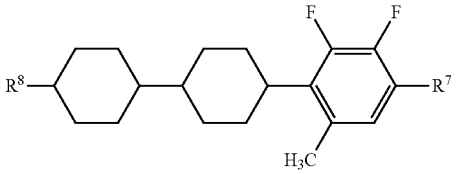
(4-2-12-1)
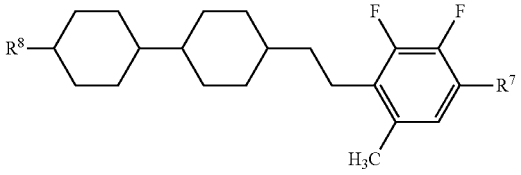
-continued
(4-2-13-1)
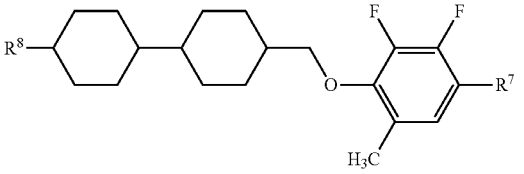
(4-2-14-1)
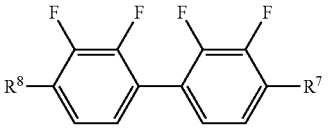
(4-2-15-1)
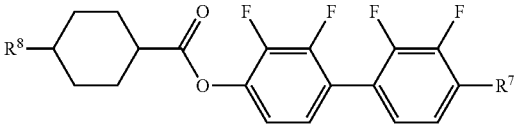
(4-3-1-1)
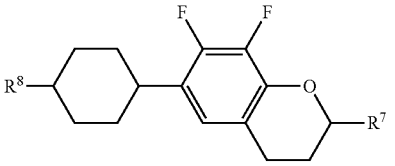
(4-3-1-2)
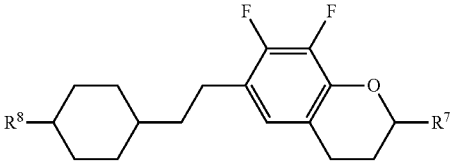
(4-3-1-3)
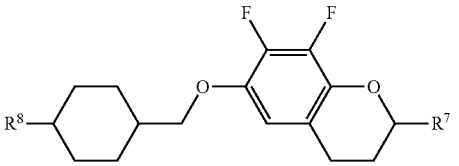
(4-3-1-4)
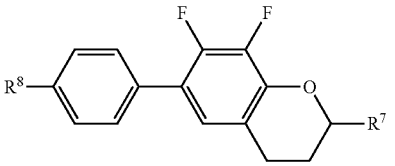
(4-3-2-1)
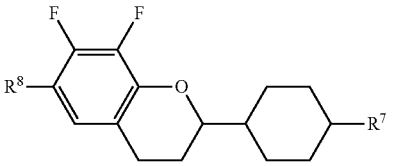
(4-3-2-2)
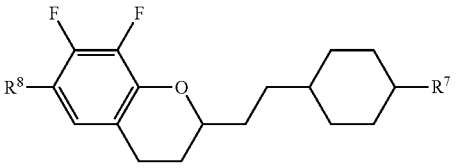

-continued (4-3-3-1)

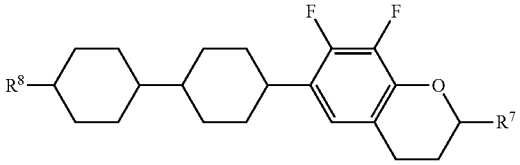

(4-3-3-2)

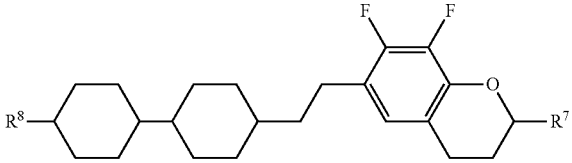

(4-3-3-3)

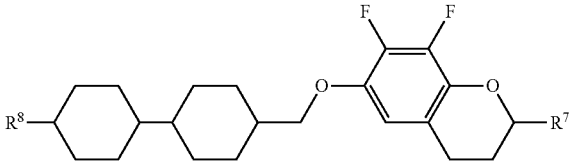

(4-3-3-4)

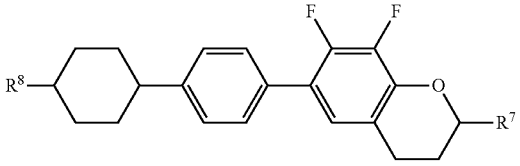

(4-3-3-5)

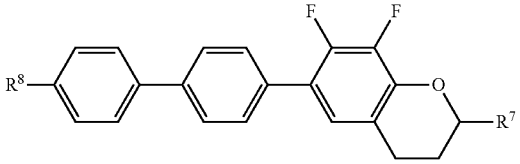

(4-3-4-1)

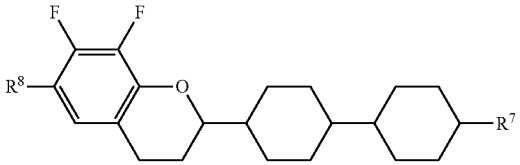

(4-3-4-2)

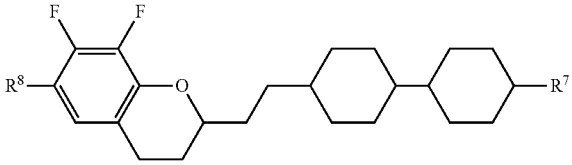

Sixth, the additive that may be mixed with the composition will be explained. Such an additive includes the optically active compound, the antioxidant, the ultraviolet light absorber, the coloring matter, the antifoaming agent, the polymerization initiator and the polymerization inhibitor. The optically active compound is mixed with the composition for the purpose of inducing a helical structure and giving a twist angle in liquid crystals. Examples of such a compound include compound (5-1) to compound (5-4). A preferred ratio of the optically active compound is 5% by weight or less, and a further preferred ratio is in the range of 0.01% by weight to 2% by weight.

(5-1)

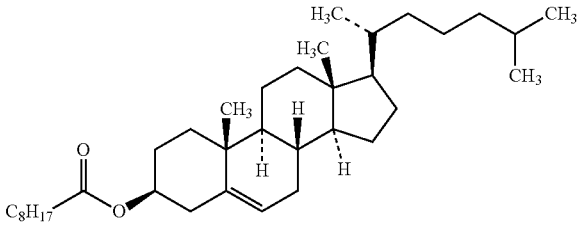

(5-2)

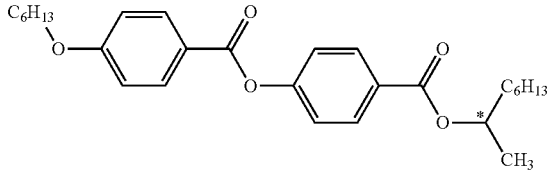

(5-3)

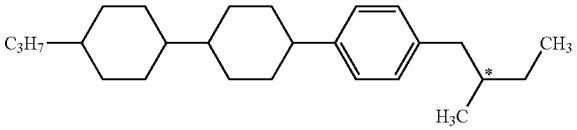

(5-4)

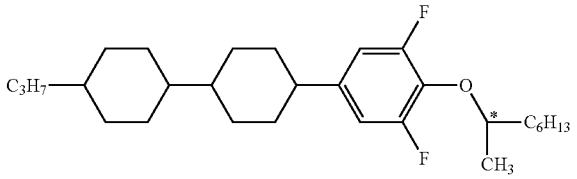

The antioxidant is mixed with the composition for the purpose of preventing a decrease in specific resistance caused by heating in air, or maintaining a large voltage holding ratio at room temperature and also at a high temperature after using the device for a long time.

(6)

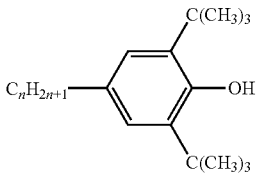

Preferred examples of the antioxidant include compound (6) where n is an integer from 1 to 9. In compound (6), preferred n is 1, 3, 5, 7 or 9. Further preferred n is 1 or 7. Compound (6) where n is 1 is effective in preventing a decrease in specific resistance caused by heating in air because the compound (6) has a large volatility. Compound (6) where n is 7 is effective in maintaining a large voltage holding ratio at room temperature and also at a high temperature after using the device for a long time because the compound (6) has a small volatility. A preferred ratio of the antioxidant is 50 ppm or more for achieving the effect thereof, and 600 ppm or less for avoiding a decrease in maximum temperature or avoiding an increase in minimum temperature. A further preferred ratio is in the range of 100 ppm to 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is 50 ppm or more for achieving the effect thereof, and 10,000 ppm or less for avoiding a decrease in maximum temperature or avoiding an increase in minimum temperature. A further preferred ratio is in the range of 100 ppm to 10,000 ppm.

A dichroic dye such as an azo dye or an anthraquinone dye is mixed with the composition to be adapted for a device having a guest host (GH) mode. A preferred ratio of the coloring matter is in the range of 0.01% by weight to 10% by weight.

The antifoaming agent such as dimethyl silicone oil or methyl phenyl silicone oil is mixed with the composition for preventing foam formation. A preferred ratio of the antifoaming agent is 1 ppm or more for achieving the effect thereof, and 1,000 ppm or less for avoiding a poor display. A further preferred ratio is in the range of 1 ppm to 500 ppm.

As a substance that easily generates a radical or ion, and is necessary for initiating a chain polymerization reaction, the polymerization initiator is mixed. For example, Irgacure 651 (registered trademark), Irgacure 184 (registered trademark) or Darocure 1173 (registered trademark) (Ciba Japan K. K.), each being the photopolymerization initiator, is suitable for radical polymerization. The polymerizable compound includes the photopolymerization initiator, preferably, in the range of 0.1% by weight to 5% by weight, and particularly preferably, in the range of 1% by weight to 3% by weight.

In a radical polymerization system, the polymerization inhibitor is mixed for the purpose of quickly reacting with the radial generated from the polymerization initiator or a monomer to change into a stable radical or a neutral compound, as a result, to terminate the polymerization reaction. The polymerization inhibitor is structurally classified into two forms. One of the forms is a radical that is stable in itself, such as tri-p-nitrophenylmethyl or di-p-fluorophenylamine, and the other is a compound that easily reacts with the radical present in a polymerization system to change into the stable radical, such as a nitro, nitroso, amino or polyhydroxy compound as the representative thereof. A preferred ratio of the polymerization inhibitor is 5 ppm or more for achieving the effect thereof and 1,000 ppm or less for avoiding a poor display. A further preferred ratio is in the range of 5 ppm to 500 ppm.

Seventh, the methods for synthesizing the component compounds will be explained. The compounds can be prepared according to known methods. The methods for synthesizing the compounds will be exemplified. Compound (1-4-1) is prepared by the method described in JP-A-H02-503441 (1990). Compound (2-1-1) and compound (2-5-1) are prepared by the method described in JP-A-S59-176221 (1984). Compound (3-18-1) is prepared by the method described in JP-A-H07-101900 (1995). Compound (4-3-2-1) is prepared by the method described in JP-A-2005-35986. The antioxidant is commercially available. Compound (6) represented by formula (6) where n is 1 is available from Sigma-Aldrich Corporation. Compound (6) where n is 7 and so forth is prepared according to the method described in U.S. Pat. No. 3,660,505.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Koza in Japanese) (Maruzen Co., Ltd.). The composition is prepared according to known methods using the compounds thus obtained. For example, the component compounds are mixed and dissolved in each other by heating.

Last, the application of the composition will be explained. Most of the compositions have a minimum temperature of −10° C. or lower, a maximum temperature of 70° C. or higher, and an optical anisotropy in the range of 0.07 to 0.20. The device containing the composition has a large voltage holding ratio. The composition is suitable for use in the AM device. The composition is particularly suitable for use in a transmissive AM device. The composition having an optical anisotropy in the range of 0.08 to 0.25 may be prepared by adjusting the ratio of the component compounds or by mixing with any other liquid crystal compound. The composition can be used as the composition having the nematic phase and as the optically active composition by adding the optically active compound.

The composition can be used for the AM device, and also for a PM device. The composition can also be used for an AM device and a PM device having a mode such as PC, TN, STN, ECB, OCB, IPS, VA or PSA. Use for the AM device having the PSA mode is particularly preferred. The device may be of a reflective type, a transmissive type or a transreflective type. Use for the transmissive device is preferred. The composition can be also used for an amorphous silicon-TFT device or a polycrystal silicon-TFT device. The composition can be also used for a nematic curvilinear aligned phase (NCAP) device prepared by microencapsulating the composition, and for a polymer dispersed (PD) device in which a three-dimensional network-polymer is formed in the composition.

EXAMPLES

In order to evaluate characteristics of a composition and a compound to be contained in the composition, the composition and the compound were made as a measurement object. When the measurement object was the composition, the measurement object was measured as is, and values obtained were described. When the measurement object was the compound, a sample for measurement was prepared by mixing the compound (15% by weight) into mother liquid crystals (85% by weight). Characteristic values of the compound were calculated from values obtained by measurement, according to an extrapolation method: (extrapolated value)=[(measured value of a sample for measurement)−0.85×(measured value of mother liquid crystals)]/0.15. When a smectic phase (or crystals) precipitated at the ratio thereof at 25° C., a ratio of the compound to the mother liquid crystals was changed step by step in the order of (10% by weight:90% by weight), (5% by weight:95% by weight) and (1% by weight:99% by weight). Values of a maximum temperature, an optical anisotropy, viscosity and a dielectric anisotropy with regard to the compound were obtained by the extrapolation method.

Components of mother liquid crystals and the ratios thereof were as described below.

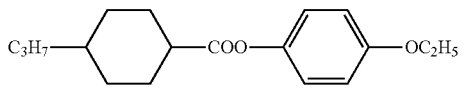

17.2 wt %

-continued

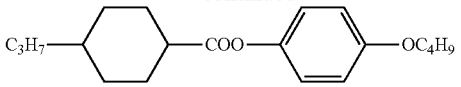

27.6 wt %

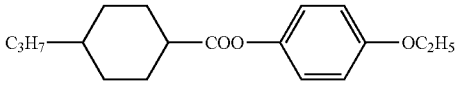

20.7 wt %

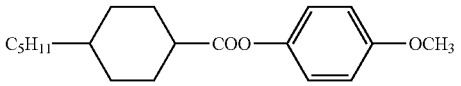

20.7 wt %

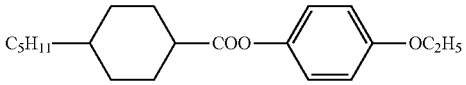

13.8 wt %

Characteristics were measured according to the methods described below. Most of the methods are applied as described in EIAJ ED-2521A of the Standard of Electronic Industries Association of Japan, or modified thereon.

Maximum Temperature of a Nematic Phase (NI; ° C.): A sample was placed on a hot plate in a melting point apparatus equipped with a polarizing microscope and was heated at a rate of 1° C. per minute. A temperature when a part of the sample began to change from a nematic phase to an isotropic liquid was measured. A higher limit of a temperature range of the nematic phase may be abbreviated as "maximum temperature."

Minimum Temperature of a Nematic Phase ($T_c$; ° C.): A sample having a nematic phase was put in glass vials and kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c \leq -20°$ C. A lower limit of a temperature range of the nematic phase may be abbreviated as "minimum temperature."

Viscosity (bulk viscosity; η; measured at 20° C.; mPa·s): A cone-plate (E type) viscometer was used for measurement.

Optical Anisotropy (refractive index anisotropy; Δn; measured at 25° C.): Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n‖) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n‖−n⊥.

Dielectric Anisotropy (Δ∈; measured at 25° C.): A value of dielectric anisotropy was calculated from an equation: Δ∈=∈‖−∈⊥. A dielectric constant (∈‖ and ∈⊥) was measured as described below.

1) Measurement of dielectric constant (∈‖): An ethanol (20 mL) solution of octadecyl triethoxysilane (0.16 mL) was applied to a well-washed glass substrate. After rotating the glass substrate with a spinner, the glass substrate was heated at 150° C. for 1 hour. A sample was put in a VA device in which a distance (cell gap) between two glass substrates was 4 micrometers, and the device was sealed with an ultraviolet-curable adhesive. Sine waves (0.5 V, 1 kHz) were applied to the device, and after 2 seconds, a dielectric constant (∈‖) in the major axis direction of liquid crystal molecules was measured.

2) Measurement of dielectric constant (∈⊥): A polyimide solution was applied to a well-washed glass substrate. After calcining the glass substrate, rubbing treatment was applied to the alignment film obtained. A sample was put in a TN device in which a distance (cell gap) between two glass substrates was 9 micrometers and a twist angle was 80 degrees. Sine waves (0.5V, 1 kHz) were applied to the device, and after 2 seconds a dielectric constant (∈⊥) in the minor axis direction of the liquid crystal molecules was measured.

Threshold Voltage (Vth; measured at 25° C.; V): An LCD-5100 luminance meter made by Otsuka Electronics Co., Ltd. was used for measurement. A light source was a halogen lamp. A sample was put in a VA device having a normally black mode, in which a distance (cell gap) between two glass substrates was 4 micrometers and a rubbing direction was anti-parallel, and the device was sealed with an ultraviolet-curable adhesive. A voltage to be applied to the device (60 Hz, rectangular waves) was stepwise increased from 0 V to 20 V at an increment of 0.02 V. On the occasion, the device was irradiated with light in a perpendicular direction, and the amount of light passing through the device was measured. A voltage-transmittance curve was prepared, in which the maximum amount of light corresponds to 100% transmittance and the minimum amount of light corresponds to 0% transmittance. A threshold voltage is a voltage at 10% transmittance.

Voltage Holding Ratio (VHR-1; measured at 25° C.; %): A TN device used for measurement had a polyimide-alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decreasing voltage was measured for 16.7 milliseconds with a high-speed voltmeter, and area A between a voltage curve and a horizontal axis in a unit cycle was obtained. Area B is an area without a decrease. A voltage holding ratio is a percentage of area A to area B.

Voltage Holding Ratio (VHR-2; measured at 80° C.; %): A TN device used for measurement had a polyimide-alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decreasing voltage was measured for 16.7 milliseconds with a high-speed voltmeter and area A between a voltage curve and a horizontal axis in a unit cycle was obtained. Area B is an area without a decrease. A voltage holding ratio is a percentage of area A to area B.

Voltage Holding Ratio (VHR-3; measured at 25° C.; %): Stability to ultraviolet light was evaluated by measuring a voltage holding ratio after irradiation with ultraviolet light. A composition having a large VHR-3 has a high stability to ultraviolet light. A TN device used for measurement had a polyimide-alignment film and a cell gap was 5 micrometers. A sample was poured into the device, and then the device was irradiated with light for 20 minutes. A light source was an ultra high-pressure mercury lamp USH-500D (made by Ushio, Inc.), and a distance between the device and the light source was 20 centimeters. In measuring VHR-3, a decreasing voltage was measured for 16.7 milliseconds. A value of VHR-3 is, preferably, in the range of 90% or more, and further preferably, 95% or more.

Voltage Holding Ratio (VHR-4; measured at 25° C.; %): A TN device into which a sample was poured was heated in a constant-temperature bath at 80° C. for 500 hours, and then stability to heat was evaluated by measuring a voltage holding ratio. A composition having a large VHR-4 has a high stability to heat. In measuring VHR-4, a decreasing voltage was measured for 16.7 milliseconds.

Response Time (τ; measured at 25° C.; millisecond): An LCD-5100 luminance meter made by Otsuka Electronics Co., Ltd. was used for measurement. A light source was a halogen lamp. A low-pass filter was set at 5 kHz. A sample was put in a PVA device having a normally black mode, in which a cell gap between two glass substrates was 3.2 micrometers and a rubbing direction was anti-parallel. The device was sealed with an ultraviolet-curable adhesive. A voltage just over a threshold voltage was applied to the device for about one minute, next, while applying a voltage of 5.6 V, the device was irradiated with ultraviolet light at 23.5 mW/cm$^2$ for about 8 minutes. Rectangular waves (60 Hz, 10 V, 0.5 second) were applied to the device. On the occasion, the device was irradiated with light in a perpendicular direction, and the amount of light passing through the device was measured. The maximum amount of light corresponds to 100% transmittance, and the minimum amount of light corresponds to 0% transmittance. A response time is time required for a change from 0% transmittance to 90% transmittance (rise time; millisecond).

Specific Resistance (ρ; measured at 25° C.; Ωcm): A sample of 1.0 milliliter was put in a vessel equipped with electrodes. A DC voltage (10V) was applied to the vessel, and a DC current after 10 seconds was measured. A specific resistance was calculated from the following equation: (specific resistance)=[(voltage)×(electric capacity of vessel)]/[(DC current)×(dielectric constant in vacuum)].

Gas Chromatographic Analysis: GC-14B gas chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was further heated to 280° C. at a rate of 5° C. per minute. A sample was dissolved in an acetone solution (0.1% by weight), and then 1 microliter of the solution was injected into the sample injector. A recorder used was C-R5A Chromatopac made by Shimadzu Corporation or the equivalent thereof. The resulting gas chromatogram showed a retention time of a peak and a peak area corresponding to each of the component compounds.

As a solvent for diluting a sample, chloroform, hexane and so forth may also be used. The following capillary columns may also be used for separating component compounds: HP-1 (length 30 m, bore 0.32 mm, film thickness 0.25 μm) made by Agilent Technologies Inc., Rtx-1 (length 30 m, bore 0.32 mm, film thickness 0.25 μm) made by Restek Corporation, and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds included in a composition may be calculated according to the method described below. The liquid crystal compounds can be detected by means of a gas chromatograph. A ratio of peak areas in the gas chromatogram corresponds to a ratio (in the number of moles) of the liquid crystal compounds. When the capillary columns described above were used, a correction coefficient of each of the liquid crystal compounds may be regarded as 1 (one). Accordingly, a ratio (% by weight) of the liquid crystal compounds was calculated from the ratio of the peak areas.

The invention will be explained in detail by way of Examples. The invention is not limited by the Examples described below. The compounds described in Comparative Example and Examples were expressed as symbols according to definitions in Table 3 below. In Table 3, a configuration of 1,4-cyclohexylene is trans. A parenthesized number next to a symbolized compound in Examples corresponds to the number of the compound. A symbol (−) means any other liquid crystal compound. A ratio (percentage) of liquid crystal compounds means weight percent (% by weight) based on the total weight of the liquid crystal composition. The liquid crystal composition further includes an impurity in addition thereto. Last, the characteristic values of the composition were summarized.

TABLE 3

Method for Description of Compounds using Symbols
R—($A_1$)—$Z_1$ . . . —$Z_n$—($A_n$)—R'

| 1) Left-terminal Group R— | Symbol |
|---|---|
| $C_nH_{2n+1}$— | n- |
| $C_nH_{2n+1}O$— | nO— |
| $C_mH_{2m+1}OC_nH_{2n}$— | mOn- |
| $CH_2$═CH— | V— |
| $C_nH_{2n+1}$—CH═CH— | nV— |
| $CH_2$═CH—$C_nH_{2n}$— | Vn- |
| $C_mH_{2m+1}$—CH═CH—$C_nH_{2n}$— | mVn- |
| $CF_2$═CH— | VFF— |
| $CF_2$═CH—$C_nH_{2n}$— | VFFn- |
| $CH_2$═CHCOO— | AC— |
| $CH_2$═C($CH_3$)COO— | MAC— |
| **2) Right-terminal Group —R'** | **Symbol** |
| —$C_nH_{2n+1}$ | -n |
| —$OC_nH_{2n+1}$ | —On |
| —CH═$CH_2$ | —V |
| —CH═CH—$C_nH_{2n+1}$ | —Vn |
| —$C_nH_{2n}$—CH═$CH_2$ | -nV |
| —CH═$CF_2$ | —VFF |
| —$COOCH_3$ | —EMe |
| —OCOCH═$CH_2$ | —AC |
| —OCOC($CH_3$)═$CH_2$ | —MAC |
| **3) Bonding Group —$Z_n$—** | **Symbol** |
| —$C_2H_4$— | 2 |
| —COO— | E |
| —CH═CH— | V |
| —C≡C— | T |
| —$CF_2O$— | X |
| —$CH_2O$— | 1O |
| —$SiH_2$— | Si |
| **4) Ring Structure —$A_n$—** | **Symbol** |
| 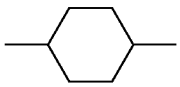 | H |
| 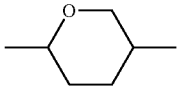 | Dh |

TABLE 3-continued

| Method for Description of Compounds using Symbols $R—(A_1)—Z_1 \ldots —Z_n—(A_n)—R'$ | |
|---|---|
| 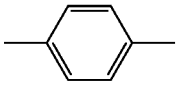 | B |
| 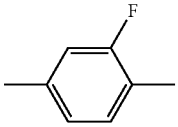 | B(F) |
| 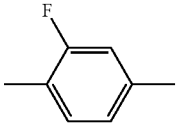 | B(2F) |
| 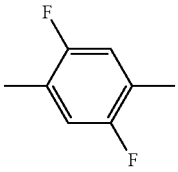 | B(2F,5F) |
| 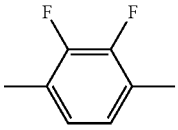 | B(2F,3F) |
| 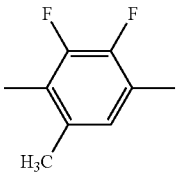 | B(2F,3F,6Me) |
| 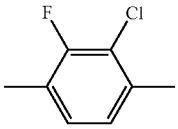 | B(2F,3Cl) |
| 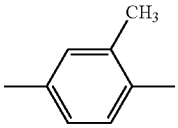 | B(Me) |
| 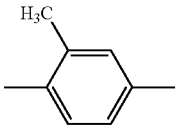 | B(2Me) |
| 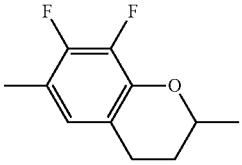 | Cro(7F,8F) |

TABLE 3-continued

| Method for Description of Compounds using Symbols $R—(A_1)—Z_1 \ldots —Z_n—(A_n)—R'$ | |
|---|---|
| 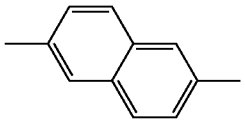 | Np |

5) Examples of Description

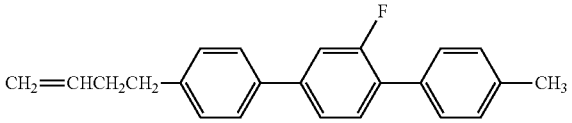

Example 1 V2-BB(F)B-1

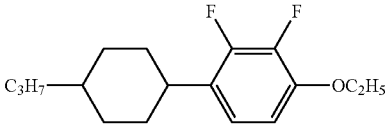

Example 2 3-HB(2F,3F)-O2

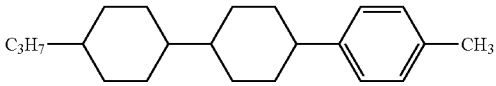

Example 3 3-HHB-1

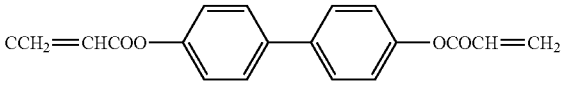

Example 4 AC-BB-AC

Comparative Example 1

The composition was a liquid crystal composition that has a negative dielectric anisotropy and does not contain the third component of the invention. The components and characteristics of the composition were as described below.

| | | |
|---|---|---|
| V-HB(2F,3F)-O2 | (1-1-1) | 15% |
| V-HB(2F,3F)-O4 | (1-1-1) | 10% |
| 2-HBB(2F,3F)-O2 | (1-7-1) | 1% |
| 3-HBB(2F,3F)-O2 | (1-7-1) | 10% |
| 5-HBB(2F,3F)-O2 | (1-7-1) | 10% |
| 2-HH-3 | (2-1-1) | 27% |
| 3-HB-O2 | (2-2-1) | 2% |
| 3-HHB-1 | (2-5-1) | 6% |
| 3-HHB-3 | (2-5-1) | 5% |
| 3-HHB-O1 | (2-5-1) | 3% |
| 2-HHB(2F,3Cl)-O2 | (4-1-2-1) | 2% |
| 3-HHB(2F,3Cl)-O2 | (4-1-2-1) | 3% |
| 4-HHB(2F,3Cl)-O2 | (4-1-2-1) | 3% |
| 5-HHB(2F,3Cl)-O2 | (4-1-2-1) | 3% |

NI=74.7° C.; Tc≤−20° C.; Δn=0.090; Δ∈=−2.9; Vth=2.16 V; τ=7.7 ms; VHR-1=99.1%; VHR-2=98.1%; VHR-3=98.1%.

Example 1

| | | |
|---|---|---|
| V-HB(2F,3F)-O2 | (1-1-1) | 15% |
| V-HB(2F,3F)-O4 | (1-1-1) | 10% |
| 2-HBB(2F,3F)-O2 | (1-7-1) | 1% |

-continued

| | | |
|---|---|---|
| 3-HBB(2F,3F)-O2 | (1-7-1) | 10% |
| 5-HBB(2F,3F)-O2 | (1-7-1) | 10% |
| 2-HH-3 | (2-1-1) | 27% |
| 3-HB-O2 | (2-2-1) | 2% |
| 3-HHB-1 | (2-5-1) | 6% |
| 3-HHB-3 | (2-5-1) | 5% |
| 3-HHB-O1 | (2-5-1) | 3% |
| 2-HHB(2F,3Cl)-O2 | (4-1-2-1) | 2% |
| 3-HHB(2F,3Cl)-O2 | (4-1-2-1) | 3% |
| 4-HHB(2F,3Cl)-O2 | (4-1-2-1) | 3% |
| 5-HHB(2F,3Cl)-O2 | (4-1-2-1) | 3% |

To 100 parts by weight of the composition above, 0.3 part by weight of the following compound as the third component of the invention was added.

MAC-BB-MAC (3-2-1)

NI=75.2° C.; Tc≤−20° C.; Δn=0.093; Δ∈=−2.9; Vth=2.18 V; τ=4.4 ms; VHR-1=99.1%; VHR-2=98.1%.

Example 2

| | | |
|---|---|---|
| 3-H2B(2F,3F)-O2 | (1-2-1) | 17% |
| 5-H2B(2F,3F)-O2 | (1-2-1) | 16% |
| 3-HBB(2F,3F)-O2 | (1-7-1) | 12% |
| 4-HBB(2F,3F)-O2 | (1-7-1) | 6% |
| 5-HBB(2F,3F)-O2 | (1-7-1) | 10% |
| 2-HH-3 | (2-1-1) | 20% |
| 3-HH-4 | (2-1-1) | 4% |
| 5-HB-O2 | (2-2-1) | 4% |
| 3-HHB-1 | (2-5-1) | 4% |
| 5-HBB(F)B-2 | (2-12-1) | 7% |

To 100 parts by weight of the composition above, 0.3 part by weight of the following compound as the third component of the invention was added.

AC-BB-AC (3-2-1)

NI=79.0° C.; Tc≤−20° C.; Δn=0.108; Δ∈=−3.1; Vth=2.35 V; τ=4.6 ms; VHR-1=99.1%; VHR-2=98.1%.

Example 3

| | | |
|---|---|---|
| V-HB(2F,3F)-O2 | (1-1-1) | 11% |
| V-HB(2F,3F)-O4 | (1-1-1) | 10% |
| 3-H2B(2F,3F)-O2 | (1-2-1) | 15% |
| 5-H2B(2F,3F)-O2 | (1-2-1) | 5% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 6% |
| 3-HH-4 | (2-1-1) | 14% |
| 3-HHB-1 | (2-5-1) | 4% |
| 3-HHB-3 | (2-5-1) | 5% |
| 3-HHB-O1 | (2-5-1) | 3% |
| 5-HBB(F)B-2 | (2-12-1) | 6% |
| 5-HBB(F)B-3 | (2-12-1) | 5% |

To 100 parts by weight of the composition above, 0.5 part by weight of the following compound as the third component of the invention was added.

MAC-B-MAC (3-1-1)

NI=85.9° C.; Tc≤−20° C.; Δn=0.117; Δ∈=−3.6; Vth=2.20 V; τ=5.4 ms; VHR-1=99.0%; VHR-2=98.1%.

Example 4

| | | |
|---|---|---|
| V-HB(2F,3F)-O2 | (1-1-1) | 13% |
| V-HB(2F,3F)-O4 | (1-1-1) | 13% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 8% |
| 2-HH-5 | (2-1-1) | 8% |
| 3-HH-4 | (2-1-1) | 14% |
| 5-HB-O2 | (2-2-1) | 8% |
| 3-HHB-1 | (2-5-1) | 3% |
| 3-HHB-3 | (2-5-1) | 4% |
| 3-HHB-O1 | (2-5-1) | 2% |
| 3-HHEBH-3 | (2-9-1) | 2% |
| 3-HHEBH-5 | (2-9-1) | 2% |
| 5-HBB(F)B-2 | (2-12-1) | 2% |
| 3-HH1OCro(7F,8F)-5 | (4-3-3-3) | 5% |

To 100 parts by weight of the composition above, 0.3 part by weight of the following compound as the third component of the invention was added.

AC-BB(2F,3F)-AC (3-5-1)

NI=85.1° C.; Tc≤−20° C.; Δn=0.102; Δ∈=−3.2; Vth=2.33 V; τ=5.3 ms; VHR-1=99.1%; VHR-2=98.1%.

Example 5

| | | |
|---|---|---|
| V-HB(2F,3F)-O2 | (1-1-1) | 10% |
| V-HB(2F,3F)-O4 | (1-1-1) | 10% |
| 3-H2B(2F,3F)-O2 | (1-2-1) | 13% |
| 5-H2B(2F,3F)-O2 | (1-2-1) | 12% |
| 3-HBB(2F,3F)-O2 | (1-7-1) | 11% |
| 4-HBB(2F,3F)-O2 | (1-7-1) | 4% |
| 5-HBB(2F,3F)-O2 | (1-7-1) | 9% |
| 3-HH-4 | (2-1-1) | 2% |
| 3-HHEH-3 | (2-4-1) | 2% |
| 3-HHEH-5 | (2-4-1) | 2% |
| 4-HHEH-3 | (2-4-1) | 2% |
| 4-HHEH-5 | (2-4-1) | 2% |
| 3-HHB-1 | (2-5-1) | 4% |
| 3-HHB-3 | (2-5-1) | 7% |
| 3-HHB-O1 | (2-5-1) | 4% |
| 3-HHEBH-3 | (2-9-1) | 3% |
| 3-HHEBH-5 | (2-9-1) | 3% |

To 100 parts by weight of the composition above, 0.3 part by weight of the following compound as the third component of the invention was added.

MAC-B(2F)B-MAC (3-3-1)

NI=91.2° C.; Tc≤−20° C.; Δn=0.108; Δ∈=−4.4; Vth=2.04 V; τ=5.8 ms; VHR-1=99.1%; VHR-2=98.0%.

Example 6

| | | |
|---|---|---|
| V-HB(2F,3F)-O2 | (1-1-1) | 11% |
| V-HB(2F,3F)-O4 | (1-1-1) | 10% |
| 3-HBB(2F,3F)-O2 | (1-7-1) | 11% |
| 4-HBB(2F,3F)-O2 | (1-7-1) | 4% |
| 5-HBB(2F,3F)-O2 | (1-7-1) | 7% |
| 2-HH-3 | (2-1-1) | 17% |
| 3-HH-4 | (2-1-1) | 8% |
| 3-HH-5 | (2-1-1) | 4% |
| 5-HB-O2 | (2-2-1) | 6% |
| 3-HHB-1 | (2-5-1) | 5% |

-continued

| | | |
|---|---|---|
| 3-HHB-3 | (2-5-1) | 6% |
| 3-HHB-O1 | (2-5-1) | 3% |
| 3-HH1OCro(7F,8F)-5 | (4-3-3-3) | 8% |

To 100 parts by weight of the composition above, 0.3 part by weight of the following compound as the third component of the invention was added.

MAC-B(2Me)B-MAC (3-12-1)

NI=79.3° C.; Tc≤−20° C.; Δn=0.093; Δ∈=−2.9; Vth=2.30 V; T=4.1 ms; VHR-1=99.2%; VHR-2=98.2%.

Example 7

| | | |
|---|---|---|
| V-HB(2F,3F)-O2 | (1-1-1) | 13% |
| V-HB(2F,3F)-O4 | (1-1-1) | 13% |
| 3-HBB(2F,3F)-O2 | (1-7-1) | 6% |
| 4-HBB(2F,3F)-O2 | (1-7-1) | 6% |
| 5-HBB(2F,3F)-O2 | (1-7-1) | 6% |
| 2-HH-3 | (2-1-1) | 26% |
| 5-HB-O2 | (2-2-1) | 5% |
| 3-HHB-1 | (2-5-1) | 4% |
| 3-HHB-3 | (2-5-1) | 7% |
| 3-HHB-O1 | (2-5-1) | 4% |
| 5-HBB(F)B-2 | (2-12-1) | 5% |
| 3-HH1OCro(7F,8F)-5 | (4-3-3-3) | 5% |

To 100 parts by weight of the composition above, 0.3 part by weight of the following compound as the third component of the invention was added.

AC-B(F)B-AC (3-4-1)

NI=75.1° C.; Tc≤−20° C.; Δn=0.096; Δ∈=−2.7; Vth=2.29 V; τ=3.8 ms; VHR-1=99.1%; VHR-2=98.1%.

Example 8

| | | |
|---|---|---|
| V-HB(2F,3F)-O2 | (1-1-1) | 14% |
| V-HB(2F,3F)-O4 | (1-1-1) | 13% |
| 3-HBB(2F,3F)-O2 | (1-7-1) | 10% |
| 4-HBB(2F,3F)-O2 | (1-7-1) | 4% |
| 5-HBB(2F,3F)-O2 | (1-7-1) | 5% |
| 2-HH-3 | (2-1-1) | 26% |
| 4-HHEH-3 | (2-4-1) | 3% |
| 4-HHEH-5 | (2-4-1) | 3% |
| 3-HHB-1 | (2-5-1) | 6% |
| 3-HHB-3 | (2-5-1) | 6% |
| 3-HHB-O1 | (2-5-1) | 3% |
| 3-HH1OCro(7F,8F)-5 | (4-3-3-3) | 7% |

To 100 parts by weight of the composition above, 0.3 part by weight of the following compound as the third component of the invention was added.

AC-B(Me)B-AC (3-13-1)

NI=75.2° C.; Tc≤−20° C.; Δn=0.088; Δ∈=−3.1; Vth=2.06 V; τ=4.3 ms; VHR-1=99.2%; VHR-2=98.1%.

Example 9

| | | |
|---|---|---|
| 3-H2B(2F,3F)-O2 | (1-2-1) | 15% |
| 5-H2B(2F,3F)-O2 | (1-2-1) | 15% |

-continued

| | | |
|---|---|---|
| 2-HBB(2F,3F)-O2 | (1-7-1) | 3% |
| 3-HBB(2F,3F)-O2 | (1-7-1) | 9% |
| 5-HBB(2F,3F)-O2 | (1-7-1) | 9% |
| 2-HH-5 | (2-1-1) | 3% |
| 3-HH-4 | (2-1-1) | 15% |
| 3-HH-5 | (2-1-1) | 4% |
| 3-HB-O2 | (2-2-1) | 12% |
| 3-HHB-1 | (2-5-1) | 3% |
| 3-HHB-3 | (2-5-1) | 4% |
| 3-HHB-O1 | (2-5-1) | 3% |
| 3-HHB(2F,3Cl)-O2 | (4-1-2-1) | 5% |

To 100 parts by weight of the composition above, 0.3 part by weight of the following compound as the third component of the invention was added.

MAC-B(2F)B(2F)-MAC (3-6-1)

NI=75.7° C.; Tc≤−20° C.; Δn=0.096; Δ∈=−2.8; Vth=2.38 V; τ=4.4 ms; VHR-1=99.1%; VHR-2=98.1%.

Example 10

| | | |
|---|---|---|
| 3-H2B(2F,3F)-O2 | (1-2-1) | 17% |
| 5-H2B(2F,3F)-O2 | (1-2-1) | 17% |
| V-HH-3 | (2-1-1) | 27% |
| V-HHB-1 | (2-5-1) | 10% |
| 2-BB(F)B-3 | (2-7-1) | 2% |
| 3-HHB(2F,3Cl)-O2 | (4-1-2-1) | 4% |
| 4-HHB(2F,3Cl)-O2 | (4-1-2-1) | 3% |
| 5-HHB(2F,3Cl)-O2 | (4-1-2-1) | 3% |
| 3-HBB(2F,3Cl)-O2 | (4-1-3-1) | 8% |
| 5-HBB(2F,3Cl)-O2 | (4-1-3-1) | 9% |

To 100 parts by weight of the composition above, 0.3 part by weight of the following compound as the third component of the invention was added.

MAC-B(2Me)B(2Me)-MAC (3-14-1)

NI=70.0° C.; Tc≤−20° C.; Δn=0.093; Δ∈=−2.8; Vth=2.33 V; τ=4.4 ms; VHR-1=99.2%; VHR-2=98.0%.

Example 11

| | | |
|---|---|---|
| V-HB(2F,3F)-O2 | (1-1-1) | 10% |
| V-HHB(2F,3F)-O2 | (1-4-1) | 15% |
| V2-HHB(2F,3F)-O2 | (1-4-1) | 15% |
| V-HH-3 | (2-1-1) | 25% |
| 1V-HH-3 | (2-1-1) | 8% |
| V-HHB-1 | (2-5-1) | 5% |
| 2-BB(F)B-3 | (2-7-1) | 10% |
| 3-HCro(7F,8F)-5 | (4-3-1-1) | 3% |
| 2O-Cro(7F,8F)H-3 | (4-3-2) | 3% |
| 3-HHCro(7F,8F)-5 | (4-3-3-1) | 3% |
| 2O-Cro(7F,8F)HH-5 | (4-3-4) | 3% |

To 100 parts by weight of the composition above, 0.3 part by weight of the following compound as the third component of the invention was added.

MAC-B(2F)B(F)-MAC (3-7-1)

NI=76.0° C.; Tc≤−20° C.; Δn=0.094; Δ∈=−3.1; Vth=2.26 V; τ=6.0 ms; VHR-1=99.0%; VHR-2=98.3%.

Example 12

| | | |
|---|---|---|
| V2-HB(2F,3F)-O2 | (1-1-1) | 15% |
| V-HBB(2F,3F)-O2 | (1-7-1) | 12% |
| V-HH-3 | (2-1-1) | 30% |
| V2-HHB-1 | (2-5-1) | 10% |
| 3-BB(F)B-2V | (2-7-1) | 8% |
| 3-H1OCro(7F,8F)-5 | (4-3-1-3) | 5% |
| 5-H1OCro(7F,8F)-4 | (4-3-1-3) | 5% |
| 3-HH1OCro(7F,8F)-5 | (4-3-3-3) | 4% |
| 5-HH1OCro(7F,8F)-5 | (4-3-3-3) | 6% |
| 3-BBCro(7F,8F)-5 | (4-3-3-5) | 5% |

To 100 parts by weight of the composition above, 0.3 part by weight of the following compound as the third component of the invention was added.

MAC-B(2Me)B(Me)-MAC (3-15-1)

NI=78.4° C.; Tc≤−20° C.; Δn=0.112; Δ∈=−3.0; Vth=2.30 V; τ=6.1 ms; VHR-1=99.1%; VHR-2=98.3%.

Example 13

| | | |
|---|---|---|
| V-HB(2F,3F)-O2 | (1-1-1) | 10% |
| V-HHB(2F,3F)-O2 | (1-4-1) | 10% |
| 1V-HHB(2F,3F)-O2 | (1-4-1) | 5% |
| 1V2-HHB(2F,3F)-O2 | (1-4-1) | 5% |
| V2-HBB(2F,3F)-O2 | (1-7-1) | 10% |
| 2-HH-3 | (2-1-1) | 22% |
| 3-HH-O1 | (2-1-1) | 3% |
| 7-HB-1 | (2-2-1) | 5% |
| 3 -HHEH-5 | (2-4-1) | 3% |
| V-HHB-1 | (2-5-1) | 7% |
| V2-BB(F)B-1 | (2-7-1) | 5% |
| 5-HBB(F)B-3 | (2-12-1) | 5% |
| 3-H2Cro(7F,8F)-5 | (4-3-1-2) | 5% |
| 2-Cro(7F,8F)2H-3 | (4-3-2-2) | 5% |

To 100 parts by weight of the composition above, 0.3 part by weight of the following compound as the third component of the invention was added.

MAC-B(F)B(2F)-MAC (3-8-1)

NI=81.2° C.; Tc≤−20° C.; Δn=0.101; Δ∈=−2.7; Vth=2.43 V; τ=4.4 ms; VHR-1=99.2%; VHR-2=98.0%.

Example 14

| | | |
|---|---|---|
| 3-HB(2F,3F)-O2 | (1-1-1) | 5% |
| V-HB(2F,3F)-O2 | (1-1-1) | 11% |
| V-HB(2F,3F)-O4 | (1-1-1) | 12% |
| V-HHB(2F,3F)-O2 | (1-4-1) | 10% |
| V-HHB(2F,3F)-O4 | (1-4-1) | 10% |
| 3-HBB(2F,3F)-O2 | (1-7-1) | 5% |
| V-HH-3 | (2-1-1) | 25% |
| V2-BB-1 | (2-3-1) | 6% |
| 1V-HBB-2 | (2-6-1) | 4% |
| 5-HBBH-3 | (2-10-1) | 5% |
| 3-BCro(7F,8F)-5 | (4-3-1 4) | 3% |
| 3-HBCro(7F,8F)-5 | (4-3-3-4) | 4% |

To 100 parts by weight of the composition above, 0.3 part by weight of the following compound as the third component of the invention was added.

MAC-B(Me)B(2Me)-MAC (3-16-1)

NI=70.1° C.; Tc≤−20° C.; Δn=0.102; Δ∈=−3.1; Vth=2.21 V; τ=4.3 ms; VHR-1=99.1%; VHR-2=98.1%.

Example 15

| | | |
|---|---|---|
| V-HB(2F,3F)-O2 | (1-1-1) | 16% |
| 1V-HB(2F,3F)-O4 | (1-1-1) | 6% |
| 3-H2B(2F,3F)-O2 | (1-2-1) | 3% |
| 3-HHB(2F,3F)-O2 | (1-4-1) | 3% |
| V-HHB(2F,3F)-O2 | (1-4-1) | 10% |
| V2-HHB(2F,3F)-O2 | (1-4-1) | 7% |
| V-HBB(2F,3F)-O2 | (1-7-1) | 10% |
| V-HH-3 | (2-1-1) | 20% |
| 1V-HH-3 | (2-1-1) | 7% |
| 5-HHEBH-3 | (2-9-1) | 4% |
| 5-HB(F)BH-3 | (2-11-1) | 4% |
| 3-HH2Cro(7F,8F)-3 | (4-3-3-2) | 3% |
| 3-HH2Cro(7F,8F)-5 | (4-3-3-2) | 4% |
| 3-Cro(7F,8F)2HH-5 | (4-3-4-2) | 3% |

To 100 parts by weight of the composition above, 0.3 part by weight of the following compound as the third component of the invention was added.

MAC-B(2F)B(2F,3F)-MAC (3-9-1)

NI=90.1° C.; Tc≤−20° C.; Δn=0.097; Δ∈=−3.6; Vth=1.92 V; τ=5.5 ms; VHR-1=99.0%; VHR-2=98.1%.

Example 16

| | | |
|---|---|---|
| V-HB(2F,3F)-O2 | (1-1-1) | 15% |
| V-HB(2F,3F)-O4 | (1-1-1) | 7% |
| 3-HBB(2F,3F)-O2 | (1-7-1) | 3% |
| V-HBB(2F,3F)-O2 | (1-7-1) | 10% |
| V2-HBB(2F,3F)-O2 | (1-7-1) | 10% |
| 2-HH-3 | (2-1-1) | 29% |
| 3-HHB-1 | (2-5-1) | 6% |
| 3-HHB-3 | (2-5-1) | 6% |
| 3-HHB-O1 | (2-5-1) | 6% |
| 3-HH1OCro(7F,8F)-5 | (4-3-3-3) | 8% |

To 100 parts by weight of the composition above, 0.3 part by weight of the following compound as the third component of the invention was added.

MAC-B(F)B(2F,3F)-MAC (3-10-1)

NI=80.9° C.; Tc≤−20° C.; Δn=0.094; Δ∈=−3.1; Vth=2.26 V; τ=4.7 ms; VHR-1=99.2%; VHR-2=98.3%.

Example 17

| | | |
|---|---|---|
| 3-HB(2F,3F)-O2 | (1-1-1) | 5% |
| 5-HB(2F,3F)-O2 | (1-1-1) | 5% |
| 3-HHB(2F,3F)-O2 | (1-4-1) | 5% |
| 3-HH2B(2F,3F)-O2 | (1-5-1) | 7% |
| 3-HH-VFF | (2-1) | 3% |
| V-HH-3 | (2-1-1) | 28% |
| 1V2-BB-1 | (2-3-1) | 4% |
| 3-HHEH-3 | (2-4-1) | 3% |
| V2-BB(F)B-1 | (2-7-1) | 4% |
| 3-HB(F)HH-5 | (2-8-1) | 5% |
| 5-HBB(2F,3Cl)-O2 | (4-1-3-1) | 5% |
| 3-DhBB(2F,3F)-O2 | (4-2) | 5% |
| 5-DhBB(2F,3F)-O2 | (4-2) | 4% |
| 3-DhB(2F,3F)-O2 | (4-2-1-1) | 6% |
| 5-DhB(2F,3F)-O2 | (4-2-1-1) | 6% |
| 3-DH1OB(2F,3F)-O2 | (4-2-3-1) | 5% |

To 100 parts by weight of the composition above, 0.3 part by weight of the following compound as the third component of the invention was added.

AC-B(2F,3F)B(2F,3F)-AC (3-11-1)

NI=72.1° C.; Tc≤−20° C.; Δn=0.096; Δ∈=−2.4; τ=3.7 ms; VHR-1=99.0%; VHR-2=98.1%.

Example 18

| | | |
|---|---|---|
| 3-H1OB(2F,3F)-O2 | (1-3-1) | 5% |
| 5-H1OB(2F,3F)-O2 | (1-3-1) | 5% |
| 3-HH1OB(2F,3F)-O2 | (1-6-1) | 5% |
| 5-HH1OB(2F,3F)-O2 | (1-6-1) | 5% |
| 3-BB(2F,5F)B-2 | (2) | 3% |
| V-HH-3 | (2-1-1) | 37% |
| 1V-HH-3 | (2-1-1) | 6% |
| 3-HHB-1 | (2-5-1) | 4% |
| 3-HHB-O1 | (2-5-1) | 4% |
| 5-HBB(2F,3Cl)-O2 | (4-1-3-1) | 6% |
| 3-DhHB(2F,3F)-O2 | (4-2-4-1) | 6% |
| 3-HDhB(2F,3F)-O2 | (4-2-5-1) | 10% |
| 1O1-HBBH-5 | (—) | 4% |

To 100 parts by weight of the composition above, 0.3 part by weight of the following compound as the third component of the invention was added.

MAC-BBB-MAC (3-18-1)

NI=92.1° C.; Tc≤−20° C.; Δn=0.086; Δ∈=−2.4; τ=3.5 ms; VHR-1=99.1%; VHR-2=98.1%.

Example 19

| | | |
|---|---|---|
| 3-HH1OB(2F,3F)-O2 | (1-6-1) | 6% |
| 3-HBB(2F,3F)-O2 | (1-7-1) | 6% |
| 5-HBB(2F,3F)-O2 | (1-7-1) | 6% |
| V-HH-3 | (2-1-1) | 32% |
| 1V-HH-3 | (2-1-1) | 7% |
| 3-HB-O2 | (2-2-1) | 3% |
| 1V-HBB-2 | (2-6-1) | 4% |
| 2-BB(F)B-3 | (2-7-1) | 5% |
| 3-Dh2B(2F,3F)-O2 | (4 2-2-1) | 9% |
| 3-Dh1OB(2F,3F)-O2 | (4-2-3-1) | 6% |
| 3-DhH1OB(2F,3F)-O2 | (4-2-6-1) | 6% |
| 3-H2Cro(7F,8F)-5 | (4-3-1-2) | 3% |
| 3-H1OCro(7F,8F)-5 | (4-3-1-3) | 4% |
| 3-HHCro(7F,8F)-5 | (4-3-3-1) | 3% |

To 100 parts by weight of the composition above, 0.3 part by weight of the following compound as the third component of the invention was added.

MAC-BB(F)B-MAC (3-19-1)

NI=72.0° C.; Tc≤−20° C.; Δn=0.093; Δ∈=−2.9; τ=3.6 ms; VHR-1=99.0%; VHR-2=98.1%.

Example 20

| | | |
|---|---|---|
| 3-HB(2F,3F)-O2 | (1-1-1) | 5% |
| 5-HB(2F,3F)-O2 | (1-1-1) | 5% |
| V-H1OB(2F,3F)-O2 | (1-3-1) | 4% |
| V2-H1OB(2F,3F)-O2 | (1-3-1) | 4% |
| V-HH2B(2F,3F)-O2 | (1-5-1) | 5% |
| V2-HH2B(2F,3F)-O2 | (1-5-1) | 5% |
| 3-HH1OB(2F,3F)-O2 | (1-6-1) | 5% |
| 4-HH1OB(2F,3F)-O2 | (1-6-1) | 3% |

-continued

| | | |
|---|---|---|
| 5-HH1OB(2F,3F)-O2 | (1-6-1) | 5% |
| V-HH-3 | (2-1-1) | 28% |
| 3-HH-4 | (2-1-1) | 10% |
| V2-BB-1 | (2-3-1) | 4% |
| 5-HBB(F)B-2 | (2-12-1) | 4% |
| 5-HBB(F)B-3 | (2-12-1) | 3% |
| 3-HB(2F,3Cl)-O2 | (4-1-1-1) | 5% |
| 3-HBB(2F,3Cl)-O2 | (4-1-3-1) | 2% |
| 5-HBB(2F,3Cl)-O2 | (4-1-3-1) | 3% |

To 100 parts by weight of the composition above, 0.3 part by weight of the following compound as the third component of the invention was added.

MAC-BB(Me)B-MAC (3-23-1)

NI=74.6° C.; Tc≤−20° C.; Δn=0.089; Δ∈=−3.4; τ=4.1 ms; VHR-1=99.0%; VHR-2=98.1%.

Example 21

| | | |
|---|---|---|
| V-HB(2F,3F)-O2 | (1-1-1) | 3% |
| 5-HHB(2F,3F)-O2 | (1-4-1) | 8% |
| V-HHB(2F,3F)-O2 | (1-4-1) | 10% |
| V-HHB(2F,3F)-O4 | (1-4-1) | 4% |
| V-HH-5 | (2-1-1) | 20% |
| 1V2-BB-1 | (2-3-1) | 10% |
| V-HHB-1 | (2-5-1) | 5% |
| V2-BB(F)B-1 | (2-7-1) | 3% |
| V2-BB(F)B-2 | (2-7-1) | 7% |
| 5-HBB(F)B-2 | (2-12-1) | 5% |
| 3-H1OB(2F,3F,6Me)-O2 | (4-2-10-1) | 5% |
| 5-H1OB(2F,3F,6Me)-O2 | (4-2-10-1) | 5% |
| 3-HH1OB(2F,3F,6Me)-O2 | (4-2-13-1) | 5% |
| 5-HH1OB(2F,3F,6Me)-O2 | (4-2-13-1) | 5% |
| 3-HEB(2F,3F)B(2F,3F)-O2 | (4-2-15-1) | 5% |

To 100 parts by weight of the composition above, 0.3 part by weight of the following compound as the third component of the invention was added.

MAC-BB(2F,5F)B-MAC (3-22-1)

NI=92.3° C.; Tc≤−30° C.; Δn=0.132; Δ∈=−3.1; τ=5.8 ms; VHR-1=99.1%; VHR-2=98.1%.

Example 22

| | | |
|---|---|---|
| 2-HBB(2F,3F)-O2 | (1-7-1) | 5% |
| 3-HBB(2F,3F)-O2 | (1-7-1) | 12% |
| 5-HBB(2F,3F)-O2 | (1-7-1) | 4% |
| V-HH-4 | (2-1-1) | 15% |
| V-HH-5 | (2-1-1) | 23% |
| 1V-HH-3 | (2-1-1) | 6% |
| V-HHB-1 | (2-5-1) | 5% |
| V2-HHB-1 | (2-5-1) | 3% |
| 3-H2B(2F,3F,6Me)-O2 | (4-2-9-1) | 4% |
| 3-H1OB(2F,3F,6Me)-O2 | (4-2-10-1) | 5% |
| 5-H1OB(2F,3F,6Me)-O2 | (4-2-10-1) | 3% |
| 3-HH2B(2F,3F,6Me)-O2 | (4-2-12-1) | 5% |
| 3-HH1OB(2F,3F,6Me)-O2 | (4-2-13-1) | 6% |
| 3-HH1OCro(7F,8F)-5 | (4-3-3-3) | 4% |

To 100 parts by weight of the composition above, 0.3 part by weight of the following compound as the third component of the invention was added.

AC-BB(2F,3F)B-AC (3-21-1)

NI=85.4° C.; Tc≤−20° C.; Δn=0.093; Δ∈=−2.8; τ=5.4 ms; VHR-1=99.2%; VHR-2=98.1%.

Example 23

| | | |
|---|---|---|
| 3-HB(2F,3F)-O2 | (1-1-1) | 8% |
| 3-HHB(2F,3F)-O2 | (1-4-1) | 10% |
| 3-HBB(2F,3F)-O2 | (1-7-1) | 11% |
| 5-HBB(2F,3F)-O2 | (1-7-1) | 5% |
| V-HH-3 | (2-1-1) | 40% |
| 3-HHEBH-3 | (2-9-1) | 4% |
| 3-HHEBH-4 | (2-9-1) | 3% |
| 3-HB(2F,3F,6Me)-O2 | (4-2-8-1) | 4% |
| 3-H2B(2F,3F,6Me)-O2 | (4-2-9-1) | 4% |
| 3-HHB(2F,3F,6Me)-O2 | (4-2-11-1) | 5% |
| 3-HH1OB(2F,3F,6Me)-O2 | (4-2-13-1) | 6% |

To 100 parts by weight of the composition above, 0.3 part by weight of the following compound as the third component of the invention was added.

MAC-BBB(2F)-MAC (3-20-1)

NI=82.9° C.; Tc≤−20° C.; Δn=0.089; Δ∈=−3.0; τ=4.3 ms; VHR-1=99.0%; VHR-2=98.1%.

Example 24

| | | |
|---|---|---|
| V-HB(2F,3F)-O2 | (1-1-1) | 12% |
| V-HB(2F,3F)-O4 | (1-1-1) | 10% |
| 3-H2B(2F,3F)-O2 | (1-2-1) | 15% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 6% |
| 3-HH-4 | (2-1-1) | 14% |
| 3-HHB-1 | (2-5-1) | 4% |
| 3-HHB-3 | (2-5-1) | 5% |
| 3-HHB-O1 | (2-5-1) | 3% |
| 5-HBB(F)B-2 | (2-12-1) | 6% |
| 5-HBB(F)B-3 | (2-12-1) | 5% |
| 4O-B(2F,3F)B(2F,3F)-O6 | (4-2-14) | 4% |

To 100 parts by weight of the composition above, 0.5 part by weight of the following compound as the third component of the invention was added.

MAC-Np-MAC (3-17-1)

NI=85.5° C.; Tc≤−20° C.; Δn=0.119; Δ∈=−3.8; Vth=2.16 V; τ=5.7 ms; VHR-1=99.0%; VHR-2=98.0%.

Example 25

| | | |
|---|---|---|
| 3-H2B(2F,3F)-O2 | (1-2-1) | 18% |
| 5-H2B(2F,3F)-O2 | (1-2-1) | 17% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HHB(2F,3Cl)-O2 | (4-1-2-1) | 4% |
| 4-HHB(2F,3Cl)-O2 | (4-1-2-1) | 3% |
| 5-HHB(2F,3Cl)-O2 | (4-1-2-1) | 3% |

To 100 parts by weight of the composition above, 0.3 part by weight of the following compound as the third component of the invention was added.

MAC-BB-MAC (3-2-1)

NI=80.7° C.; Tc≤−20° C.; Δn=0.095; Δ∈=−3.4; τ=5.4 ms; VHR-1=99.0%; VHR-2=98.0%.

Example 26

| | | |
|---|---|---|
| 3-H2B(2F,3F)-O2 | (1-2-1) | 18% |
| 5-H2B(2F,3F)-O2 | (1-2-1) | 17% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HHB(2F,3Cl)-O2 | (4-1-2-1) | 4% |
| 4-HHB(2F,3Cl)-O2 | (4-1-2-1) | 3% |
| 5-HHB(2F,3Cl)-O2 | (4-1-2-1) | 3% |

To 100 parts by weight of the composition above, 0.3 part by weight of the following compound as the third component of the invention was added.

MAC-B(2F)B-MAC (3-3-1)

NI=80.5° C.; Tc≤−20° C.; Δn=0.094; Δ∈=−3.5; τ=5.3 ms; VHR-1=99.1%; VHR-2=98.1%.

Example 27

| | | |
|---|---|---|
| 3-H2B(2F,3F)-O2 | (1-2-1) | 18% |
| 5-H2B(2F,3F)-O2 | (1-2-1) | 17% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HHB(2F,3Cl)-O2 | (4-1-2-1) | 4% |
| 4-HHB(2F,3Cl)-O2 | (4-1-2-1) | 3% |
| 5-HHB(2F,3Cl)-O2 | (4-1-2-1) | 3% |

To 100 parts by weight of the composition above, 0.3 part by weight of the following compound as the third component of the invention was added.

MAC-B(F)B-MAC (3-4-1)

NI=80.5° C.; Tc≤−20° C.; Δn=0.094; Δ∈=−3.5; τ=5.3 ms; VHR-1=99.1%; VHR-2=98.1%.

Example 28

| | | |
|---|---|---|
| 3-H2B(2F,3F)-O2 | (1-2-1) | 18% |
| 5-H2B(2F,3F)-O2 | (1-2-1) | 17% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 6% |
| 2-HH-3 | (2-1-1) | 14% |
| 3-HH-4 | (2-1-1) | 8% |
| 3-HHB-1 | (2-5-1) | 5% |
| 3-HHB-3 | (2-5-1) | 6% |
| 3-HHB-O1 | (2-5-1) | 4% |
| 3-HH1OCro(7F,8F)-5 | (4-3-3-3) | 6% |

To 100 parts by weight of the composition above, 0.3 part by weight of the following compound as the third component of the invention was added.

MAC-BB-MAC (3-2-1)

NI=79.4° C.; Tc≤−20° C.; Δn=0.095; Δ∈=−3.4; τ=5.4 ms; VHR-1=99.0%; VHR-2=98.0%.

Example 29

| | | |
|---|---|---|
| 3-H2B(2F,3F)-O2 | (1-2-1) | 18% |
| 5-H2B(2F,3F)-O2 | (1-2-1) | 17% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 6% |
| 2-HH-3 | (2-1-1) | 14% |
| 3-HH-4 | (2-1-1) | 8% |
| 3-HHB-1 | (2-5-1) | 5% |
| 3-HHB-3 | (2-5-1) | 6% |
| 3-HHB-O1 | (2-5-1) | 4% |
| 3-HH1OCro(7F,8F)-5 | (4-3-3-3) | 6% |

To 100 parts by weight of the composition above, 0.3 part by weight of the following compound as the third component of the invention was added.

MAC-B(2F)B-MAC (3-3-1)

NI=79.1° C.; Tc≤−20° C.; Δn=0.094; Δ∈=−3.5; τ=5.3 ms; VHR-1=99.1%; VHR-2=98.2%.

Example 30

| | | |
|---|---|---|
| 3-H2B(2F,3F)-O | (1-2-1) | 18% |
| 5-H2B(2F,3F)-O2 | (1-2-1) | 17% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 6% |
| 2-HH-3 | (2-1-1) | 14% |
| 3-HH-4 | (2-1-1) | 8% |
| 3-HHB-1 | (2-5-1) | 5% |
| 3-HHB-3 | (2-5-1) | 6% |
| 3-HHB-O1 | (2-5-1) | 4% |
| 3-HH1OCro(7F,8F)-5 | (4-3-3-3) | 6% |

To 100 parts by weight of the composition above, 0.3 part by weight of the following compound as the third component of the invention was added.

MAC-B(F)B-MAC (3-4-1)

NI=79.1° C.; Tc≤−20° C.; Δn=0.094; Δ∈=−3.5; τ=5.3 ms; VHR-1=99.1%; VHR-2=98.2%.

Example 31

| | | |
|---|---|---|
| 3-H2B(2F,3F)-O2 | (1-2-1) | 18% |
| 5-H2B(2F,3F)-O2 | (1-2-1) | 17% |
| 3-HHB(2F,3F)-O2 | (1-4-1) | 5% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HHB(2F,3Cl)-O2 | (4-1-2-1) | 3% |
| 5-HHB(2F,3Cl)-O2 | (4-1-2-1) | 2% |

To 100 parts by weight of the composition above, 0.3 part by weight of the following compound as the third component of the invention was added.

MAC-B(2F)B-MAC (3-3-1)

NI=81.5° C.; Tc≤−20° C.; Δn=0.095; Δ∈=−3.5; τ=5.2 ms; VHR-1=99.1%; VHR-2=98.2%.

Example 32

| | | |
|---|---|---|
| 3-H2B(2F,3F)-O2 | (1-2-1) | 18% |
| 5-H2B(2F,3F)-O2 | (1-2-1) | 17% |
| 3-HHB(2F,3F)-O2 | (1-4-1) | 5% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HHB(2F,3Cl)-O2 | (4-1-2-1) | 3% |
| 5-HHB(2F,3Cl)-O2 | (4-1-2-1) | 2% |

To 100 parts by weight of the composition above, 0.3 part by weight of the following compound as the third component of the invention was added.

MAC-B(F)B-MAC (3-4-1)

NI=81.5° C.; Tc≤−20° C.; Δn=0.095; Δ∈=−3.5; τ=5.2 ms; VHR-1=99.1%; VHR-2=98.2%.

Example 33

| | | |
|---|---|---|
| 3-H2B(2F,3F)-O2 | (1-2-1) | 18% |
| 5-H2B(2F,3F)-O2 | (1-2-1) | 17% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HHB(2F,3Cl)-O2 | (4-1-2-1) | 3% |
| 5-HHB(2F,3Cl)-O2 | (4-1-2-1) | 2% |
| 3-HDhB(2F,3F)-O2 | (4-2-5-1) | 5% |

To 100 parts by weight of the composition above, 0.3 part by weight of the following compound as the third component of the invention was added.

MAC-B(2F)B-MAC (3-3-1)

NI=80.3° C.; Tc≤−20° C.; Δn=0.094; Δ∈=−3.6; τ=5.3 ms; VHR-1=99.1%; VHR-2=98.2%.

Example 34

| | | |
|---|---|---|
| 3-H2B(2F,3F)-O2 | (1-2-1) | 18% |
| 5-H2B(2F,3F)-O2 | (1-2-1) | 17% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |

-continued

| | | |
|---|---|---|
| 3-HHB-O1 | (2-5-1) | 4% |
| 3-HHB(2F,3Cl)-O2 | (4-1-2-1) | 3% |
| 5-HHB(2F,3Cl)-O2 | (4-1-2-1) | 2% |
| 3-HDhB(2F,3F)-O2 | (4-2-5-1) | 5% |

To 100 parts by weight of the composition above, 0.3 part by weight of the following compound as the third component of the invention was added.

MAC-B(F)B-MAC (3-4-1)

NI=80.3° C.; Tc≤−20° C.; Δn=0.094; Δ∈=−3.6; τ=5.3 ms; VHR-1=99.1%; VHR-2=98.2%.

Example 35

| | | |
|---|---|---|
| 3-H2B(2F,3F)-O2 | (1-2-1) | 18% |
| 5-H2B(2F,3F)-O2 | (1-2-1) | 17% |
| 3-HHB(2F,3F)-O2 | (1-4-1) | 5% |
| 5-HHB(2F,3F)-O2 | (1-4-1) | 5% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |

To 100 parts by weight of the composition above, 0.3 part by weight of the following compound as the third component of the invention was added.

MAC-B(2F)B-MAC (3-3-1)

NI=82.3° C.; Tc≤−20° C.; Δn=0.096; Δ∈=−3.6; τ=5.1 ms; VHR-1=99.2%; VHR-2=98.2%.

Example 36

| | | |
|---|---|---|
| 3-H2B(2F,3F)-O2 | (1-2-1) | 18% |
| 5-H2B(2F,3F)-O2 | (1-2-1) | 17% |
| 3-HHB(2F,3F)-O2 | (1-4-1) | 5% |
| 5-HHB(2F,3F)-O2 | (1-4-1) | 5% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |

To 100 parts by weight of the composition above, 0.3 part by weight of the following compound as the third component of the invention was added.

MAC-B(F)B-MAC (3-4-1)

NI=82.3° C.; Tc≤−20° C.; Δn=0.096; Δ∈=−3.6; τ=5.1 ms; VHR-1=99.2%; VHR-2=98.2%.

Example 37

| | | |
|---|---|---|
| 3-H2B(2F,3F)-O2 | (1-2-1) | 18% |
| 5-H2B(2F,3F)-O2 | (1-2-1) | 17% |

-continued

| | | |
|---|---|---|
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HDhB(2F,3F)-O2 | (4-2-5-1) | 5% |
| 5-HDhB(2F,3F)-O2 | (4-2-5-1) | 5% |

To 100 parts by weight of the composition above, 0.3 part by weight of the following compound as the third component of the invention was added.

MAC-B(2F)B-MAC (3-3-1)

NI=80.0° C.; Tc≤−20° C.; Δn=0.094; Δ∈=−3.7; τ=5.2 ms; VHR-1=99.2%; VHR-2=98.2.

Example 38

| | | |
|---|---|---|
| 3-H2B(2F,3F)-O2 | (1-2-1) | 18% |
| 5-H2B(2F,3F)-O2 | (1-2-1) | 17% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HDhB(2F,3F)-O2 | (4-2-5-1) | 5% |
| 5-HDhB(2F,3F)-O2 | (4-2-5-1) | 5% |

To 100 parts by weight of the composition above, 0.3 part by weight of the following compound as the third component of the invention was added.

MAC-B(F)B-MAC (3-4-1)

NI=80.0° C.; Tc≤−20° C.; Δn=0.094; Δ∈=−3.7; τ=5.2 ms; VHR-1=99.2%; VHR-2=98.2%.

Example 39

| | | |
|---|---|---|
| 3-H2B(2F,3F)-O2 | (1-2-1) | 18% |
| 5-H2B(2F,3F)-O2 | (1-2-1) | 17% |
| 3-HHB(2F,3F)-O2 | (1-4-1) | 5% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HDhB(2F,3F)-O2 | (4-2-5-1) | 5% |

To 100 parts by weight of the composition above, 0.3 part by weight of the following compound as the third component of the invention was added.

MAC-B(2F)B-MAC (3-3-1)

NI=81.9° C.; Tc≤−20° C.; Δn=0.096; Δ∈=−3.6; τ=5.2 ms; VHR-1=99.1%; VHR-2=98.2%.

Example 40

| | | |
|---|---|---|
| 3-H2B(2F,3F)-O2 | (1-2-1) | 18% |
| 5-H2B(2F,3F)-O2 | (1-2-1) | 17% |
| 3-HHB(2F,3F)-O2 | (1-4-1) | 5% |
| 3-HBB(2F,3F)-O2 | (1-7-1) | 9% |
| 4-HBB(2F,3F)-O2 | (1-7-1) | 3% |
| 5-HBB(2F,3F)-O2 | (1-7-1) | 9% |
| 2-HH-3 | (2-1-1) | 18% |
| 3-HH-4 | (2-1-1) | 2% |
| 3-HHB-1 | (2-5-1) | 5% |
| 3-HHB-3 | (2-5-1) | 5% |
| 3-HHB-O1 | (2-5-1) | 4% |
| 3-HDhB(2F,3F)-O2 | (4-2-5-1) | 5% |

To 100 parts by weight of the composition above, 0.3 part by weight of the following compound as the third component of the invention was added.

MAC-B(F)B-MAC (3-4-1)

NI=81.9° C.; Tc≤−20° C.; Δn=0.096; Δ∈=−3.6; τ=5.2 ms; VHR-1=99.1%; VHR-2=98.2%.

Example 41

| | | |
|---|---|---|
| 3-H2B(2F,3F)-O2 | (1-2-1) | 20% |
| 5-H2B(2F,3F)-O2 | (1-2-1) | 20% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 3% |
| 2-HH-3 | (2-1-1) | 6% |
| 3-HH-4 | (2-1-1) | 17% |
| 3-HHB-O1 | (2-5-1) | 3% |
| 3-HHEBH-3 | (2-9-1) | 4% |
| 3-HHEBH-4 | (2-9-1) | 3% |
| 3-HH10Cro(7F,8F)-5 | (4-3-3-3) | 8% |

To 100 parts by weight of the composition above, 0.3 part by weight of the following compound as the third component of the invention was added.

MAC-B(2F)B-MAC (3-3-1)

NI=80.6° C.; Tc≤−20° C.; Δn=0.090; Δ∈=−3.9; τ=5.3 ms; VHR-1=99.1%; VHR-2=98.1%.

Example 42

| | | |
|---|---|---|
| 3-H2B(2F,3F)-O2 | (1-2-1) | 20% |
| 5-H2B(2F,3F)-O2 | (1-2-1) | 20% |
| 3-HBB(2F,3F)-O2 | (1-7-1) | 10% |
| 4-HBB(2F,3F)-O2 | (1-7-1) | 6% |
| 5-HBB(2F,3F)-O2 | (1-7-1) | 3% |
| 2-HH-3 | (2-1-1) | 6% |
| 3-HH-4 | (2-1-1) | 17% |
| 3-HHB-O1 | (2-5-1) | 3% |
| 3-HHEBH-3 | (2-9-1) | 4% |
| 3-HHEBH-4 | (2-9-1) | 3% |
| 3-HH10Cro(7F,8F)-5 | (4-3-3-3) | 8% |

To 100 parts by weight of the composition above, 0.3 part by weight of the following compound as the third component of the invention was added.

MAC-B(F)B-MAC (3-4-1)

NI=80.6° C.; Tc≤−20° C.; Δn=0.090; Δ∈=−3.9; τ=5.3 ms; VHR-1=99.1%; VHR-2=98.1%.

Example 43

| | | |
|---|---|---|
| 3-H2B(2F,3F)-O2 | (1-2-1) | 20% |
| 5-H2B(2F,3F)-O2 | (1-2-1) | 14% |
| 3-HBB(2F,3F)-O2 | (1-7-1) | 9% |
| 4-HBB(2F,3F)-O2 | (1-7-1) | 3% |
| 2-HH-3 | (2-1-1) | 19% |
| 3-HH-4 | (2-1-1) | 7% |
| 3-HHB-1 | (2-5-1) | 3% |
| 3-HHB-3 | (2-5-1) | 4% |
| 3-HHEBH-3 | (2-9-1) | 4% |
| 3-HHEBH-4 | (2-9-1) | 4% |
| 3-HDhB(2F,3F)-O2 | (4-2-5-1) | 8% |
| 3-HH1OCro(7F,8F)-5 | (4-3-3-3) | 5% |

To 100 parts by weight of the composition above, 0.3 part by weight of the following compound as the third component of the invention was added.

MAC-B(2F)B-MAC (3-3-1)

NI=80.1° C.; Tc≤−20° C.; Δn=0.084; Δ∈=−3.6; τ=5.3 ms; VHR-1=99.1%; VHR-2=98.1%.

Example 44

| | | |
|---|---|---|
| 3-H2B(2F,3F)-O2 | (1-2-1) | 20% |
| 5-H2B(2F,3F)-O2 | (1-2-1) | 14% |
| 3-HBB(2F,3F)-O2 | (1-7-1) | 9% |
| 4-HBB(2F,3F)-O2 | (1-7-1) | 3% |
| 2-HH-3 | (2-1-1) | 19% |
| 3-HH-4 | (2-1-1) | 7% |
| 3-HHB-1 | (2-5-1) | 3% |
| 3-HHB-3 | (2-5-1) | 4% |
| 3-HHEBH-3 | (2-9-1) | 4% |
| 3-HHEBH-4 | (2-9-1) | 4% |
| 3-HDhB(2F,3F)-O2 | (4-2-5-1) | 8% |
| 3-HH10Cro(7F,8F)-5 | (4-3-3-3) | 5% |

To 100 parts by weight of the composition above, 0.3 part by weight of the following compound as the third component of the invention was added.

MAC-B(F)B-MAC (3-4-1)

NI=80.1° C.; Tc ≤−20° C.; Δn=0.084; Δ∈=−3.6; τ=5.3 ms; VHR-1=99.1%; VHR-2=98.1%.

Example 45

| | | |
|---|---|---|
| 3-H2B(2F,3F)-O2 | (1-2-1) | 20% |
| 5-H2B(2F,3F)-O2 | (1-2-1) | 13% |
| 3-HBB(2F,3F)-O2 | (1-7-1) | 10% |
| 2-HH-3 | (2-1-1) | 19% |
| 3-HH-4 | (2-1-1) | 7% |
| 3 -HHB- 1 | (2-5-1) | 4% |
| 3-HHB-3 | (2-5-1) | 5% |
| 3-HHB-O1 | (2-5-1) | 4% |
| 3-HHEBH-3 | (2-9-1) | 5% |
| 3-HDhB(2F,3F)-O2 | (4-2-5-1) | 8% |
| 3-HH10Cro(7F,8F)-5 | (4-3-3-3) | 5% |

To 100 parts by weight of the composition above, 0.3 part by weight of the following compound as the third component of the invention was added.

MAC-B(2F)B-MAC (3-3-1)

NI=80.0° C.; Tc≤−20° C.; Δn=0.084; Asd=−3.4; τ=5.3 ms; VHR-1=99.1%; VHR-2=98.1%.

Example 46

| | | |
|---|---|---|
| 3-H2B(2F,3F)-O2 | (1-2-1) | 20% |
| 5-H2B(2F,3F)-O2 | (1-2-1) | 13% |
| 3-HBB(2F,3F)-O2 | (1-7-1) | 10% |
| 2-HH-3 | (2-1-1) | 19% |
| 3-HH-4 | (2-1-1) | 7% |
| 3 -HHB- 1 | (2-5-1) | 4% |
| 3-HHB-3 | (2-5-1) | 5% |
| 3-HHB-O1 | (2-5-1) | 4% |
| 3-HHEBH-3 | (2-9-1) | 5% |
| 3-HDhB(2F,3F)-O2 | (4-2-5-1) | 8% |
| 3-HH1OCro(7F,8F)-5 | (4-3-3-3) | 5% |

To 100 parts by weight of the composition above, 0.3 part by weight of the following compound as the third component of the invention was added.

MAC-B(F)B-MAC (3-4-1)

NI=80.0° C.; Tc≤−20° C.; Δn=0.084; Δ∈=−3.4; τ=5.3 ms; VHR-1=99.1%; VHR-2=98.1%.

Example 47

| | | |
|---|---|---|
| 3-H2B(2F,3F)-O2 | (1-2-1) | 20% |
| 5-H2B(2F,3F)-O2 | (1-2-1) | 12% |
| 3-HBB(2F,3F)-O2 | (1-7-1) | 10% |
| 4-HBB(2F,3F)-O2 | (1-7-1) | 3% |
| 2-HH-3 | (2-1-1) | 21% |
| 3-HH-4 | (2-1-1) | 8% |
| 3 -HHB- 1 | (2-5-1) | 4% |
| 3-HHB-3 | (2-5-1) | 4% |
| 3-HHB-O1 | (2-5-1) | 4% |
| 3-HHEBH-3 | (2-9-1) | 5% |
| 3-HDhB(2F,3F)-O2 | (4-2-5-1) | 4% |
| 3-HH1OCro(7F,8F)-5 | (4-3-3-3) | 5% |

To 100 parts by weight of the composition above, 0.3 part by weight of the following compound as the third component of the invention was added.

MAC-B(2F)B-MAC (3-3-1)

NI=79.2° C.; Tc≤−20° C.; Δn=0.083; Δ∈=−3.0; T=5.2 ms; VHR-1=99.1%; VHR-2=98.1%.

Example 48

| | | |
|---|---|---|
| 3-H2B(2F,3F)-O2 | (1-2-1) | 20% |
| 5-H2B(2F,3F)-O2 | (1-2-1) | 12% |
| 3-HBB(2F,3F)-O2 | (1-7-1) | 10% |
| 4-HBB(2F,3F)-O2 | (1-7-1) | 3% |
| 2-HH-3 | (2-1-1) | 21% |
| 3-HH-4 | (2-1-1) | 8% |
| 3-HHB-1 | (2-5-1) | 4% |
| 3-HHB-3 | (2-5-1) | 4% |
| 3-HHB-O1 | (2-5-1) | 4% |
| 3-HHEBH-3 | (2-9-1) | 5% |
| 3-HDhB(2F,3F)-O2 | (4-2-5-1) | 4% |
| 3-HH1OCro(7F,8F)-5 | (4-3-3-3) | 5% |

To 100 parts by weight of the composition above, 0.3 part by weight of the following compound as the third component of the invention was added.

MAC-B(F)B-MAC (3-4-1)

NI=79.2° C.; Tc≤−20° C.; Δn=0.083; Δ∈=−3.0; τ=5.2 ms; VHR-1=99.1%; VHR-2=98.1%.

Example 49

| | | |
|---|---|---|
| 3-H2B(2F,3F)-O2 | (1-2-1) | 15% |
| 5-H2B(2F,3F)-O2 | (1-2-1) | 10% |
| 3-HHB(2F,3F)-O2 | (1-4-1) | 6% |
| 3-HBB(2F,3F)-O2 | (1-7-1) | 11% |
| 4-HBB(2F,3F)-O2 | (1-7-1) | 10% |
| 5-HBB(2F,3F)-O2 | (1-7-1) | 7% |
| 2-HH-3 | (2-1-1) | 22% |
| 3-HB-O2 | (2-2-1) | 7% |
| 5-HB-O2 | (2-2-1) | 6% |
| 5-HBB(F)B-2 | (2-12-1) | 6% |

To 100 parts by weight of the composition above, 0.2 part by weight of the following compound as the third component of the invention was added.

MAC-B(2F)B-MAC (3-3-1)

NI=73.2° C.; Tc≤−20° C.; Δn=0.106; Δ∈=−3.0; τ=5.2 ms; VHR-1=99.2%; VHR-2=98.2%.

Example 50

| | | |
|---|---|---|
| 3-H2B(2F,3F)-O2 | (1-2-1) | 15% |
| 5-H2B(2F,3F)-O2 | (1-2-1) | 10% |
| 3-HHB(2F,3F)-O2 | (1-4-1) | 6% |
| 3-HBB(2F,3F)-O2 | (1-7-1) | 11% |
| 4-HBB(2F,3F)-O2 | (1-7-1) | 10% |
| 5-HBB(2F,3F)-O2 | (1-7-1) | 7% |
| 2-HH-3 | (2-1-1) | 22% |
| 3-HB-O2 | (2-2-1) | 7% |
| 5-HB-O2 | (2-2-1) | 6% |
| 5-HBB(F)B-2 | (2-12-1) | 6% |

To 100 parts by weight of the composition above, 0.2 part by weight of the following compound as the third component of the invention was added.

MAC-B(F)B-MAC (3-4-1)

NI=73.2° C.; Tc≤−20° C.; Δn=0.106; Δ∈=−3.0; τ=5.2 ms; VHR-1=99.2%; VHR-2=98.2%.

Example 51

| | | |
|---|---|---|
| 3-H2B(2F,3F)-O2 | (1-2-1) | 15% |
| 5-H2B(2F,3F)-O2 | (1-2-1) | 7% |
| 3-HBB(2F,3F)-O2 | (1-7-1) | 11% |
| 4-HBB(2F,3F)-O2 | (1-7-1) | 10% |
| 5-HBB(2F,3F)-O2 | (1-7-1) | 7% |
| 2-HH-3 | (2-1-1) | 22% |
| 3-HH-4 | (2-1-1) | 3% |
| 3-HB-O2 | (2-2-1) | 7% |
| 5-HB-O2 | (2-2-1) | 6% |
| 5-HBB(F)B-2 | (2-12-1) | 6% |
| 3-HDhB(2F,3F)-O2 | (4-2-5-1) | 6% |

To 100 parts by weight of the composition above, 0.2 part by weight of the following compound as the third component of the invention was added.

MAC-B(2F)B-MAC (3-3-1)

NI=74.7° C.; Tc≤−20° C.; Δn=0.104; Δ∈=−3.0; τ=5.2 ms; VHR-1=99.1%; VHR-2=98.2%.

Example 52

| | | |
|---|---|---|
| 3-H2B(2F,3F)-O2 | (1-2-1) | 15% |
| 5-H2B(2F,3F)-O2 | (1-2-1) | 7% |
| 3-HBB(2F,3F)-O2 | (1-7-1) | 11% |
| 4-HBB(2F,3F)-O2 | (1-7-1) | 10% |
| 5-HBB(2F,3F)-O2 | (1-7-1) | 7% |
| 2-HH-3 | (2-1-1) | 22% |
| 3-HH-4 | (2-1-1) | 3% |
| 3-HB-O2 | (2-2-1) | 7% |
| 5-HB-O2 | (2-2-1) | 6% |
| 5-HBB(F)B-2 | (2-12-1) | 6% |
| 3-HDhB(2F,3F)-O2 | (4-2-5-1) | 6% |

To 100 parts by weight of the composition above, 0.2 part by weight of the following compound as the third component of the invention was added.

MAC-B(F)B-MAC (3-4-1)

NI=74.7° C.; Tc≤−20° C.; Δn=0.104; Δ∈=−3.0; τ=5.2 ms; VHR-1=99.1%; VHR-2=98.2%.

The compositions according to Examples 1 to 52 have a shorter response time in comparison with the composition according to Comparative Example 1. Thus, the liquid crystal composition of the invention is so much superior in characteristics to the composition shown in Comparative Example 1.

Industrial Applicability

The invention provides a liquid crystal composition satisfying at least one of characteristics such as a high maximum temperature of a nematic phase, a low minimum temperature of the nematic phase, a small viscosity, a suitable optical anisotropy, a large negative dielectric anisotropy, a large specific resistance, a high stability to ultraviolet light and a high stability to heat, or having a suitable balance regarding at least two of the characteristics. A liquid crystal display device containing such a liquid crystal composition is applied as an AM device having a short response time, a large voltage holding ratio, a large contrast ratio, a long service life and so forth, and thus can be used for a liquid crystal projector, a liquid crystal television and so forth.

What is claimed is:

[1. A liquid crystal composition, containing at least one compound selected from the group of compounds represented by formula (1) as a first component, at least one compound selected from the group of compounds represented by formula (2) as a second component and at least one compound selected from the group of compounds represented by formula (3) as a third component:

(1)

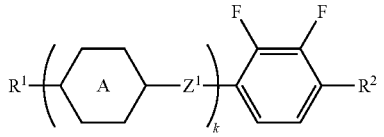

(2)

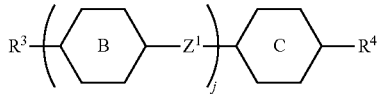

(3)

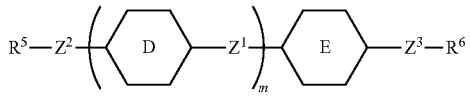

wherein $R^1$, $R^2$, $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; $R^5$ and $R^6$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, acrylate, methacrylate, vinyloxy, propenylether, oxirane, oxetane or vinylketone, and at least one of $R^5$ and $R^6$ is acrylate, methacrylate, propenylether, oxirane, oxetane or vinylketone; ring A is independently 1,4-cyclohexylene or 1,4-phenylene; ring B and ring C are independently 1,4-cyclohexylene, 1,4-phenylene, 2-fluoro-1,4-phenylene, 3-fluoro-1,4-phenylene or 2,5-difluoro-1,4-phenylene; ring D and ring E are independently 1,4-cyclohexylene, 1,4-phenylene, 2-fluoro-1,4-phenylene, 3-fluoro-1,4-phenylene, 2,3-difluoro-1,4-phenylene, 2,5-difluoro-1,4-phenylene, 3,5-difluoro-1,4-phenylene, 2-methyl-1,4-phenylene, 3-methyl-1,4-phenylene or 2,6-naphthalene; $Z^1$ is independently a single bond, ethylene, methyleneoxy or carbonyloxy; $Z^2$ and $Z^3$ are independently a single bond, alkylene having 1 to 12 carbons, or alkylene having 1 to 12 carbons in which arbitrary —$CH_2$— is replaced by —O—; k and j are independently 1, 2 or 3; and m is 0, 1 or 2, and wherein the at least one compound as the second component comprises arbitrary one of compounds 2-HH-3 and V-HH-3 shown below:

2-HH-3

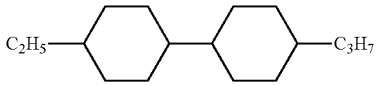

V-HH-3

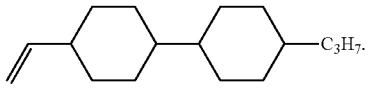

]

[2. The liquid crystal composition according to claim 1, wherein the first component is at least one compound selected from the group of compounds represented by formula (1-1) to formula (1-7):

(1-1)

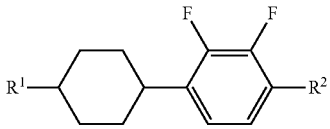

(1-2)

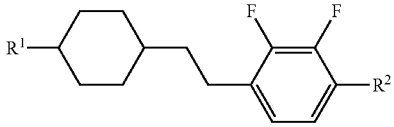

(1-3)

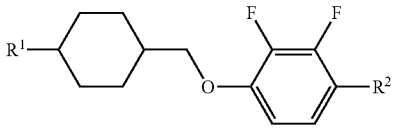

(1-4)

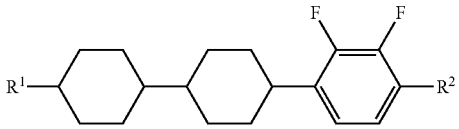

-continued (1-5)

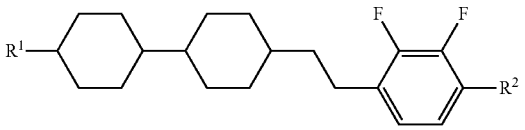

(1-6)

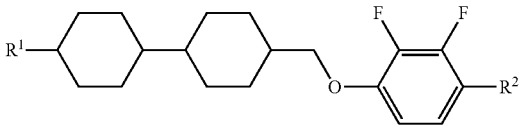

(1-7)

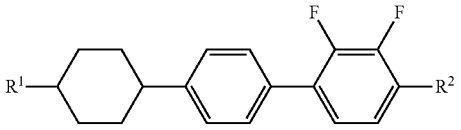

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.]

[3. The liquid crystal composition according to claim 1, wherein the second component further comprises at least one compound selected from the group of compounds represented by formula (2-1) to formula (2-12) other than the compounds 2-HH-3 and V-HH-3:

(2-1)

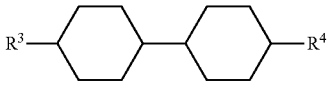

(2-2)

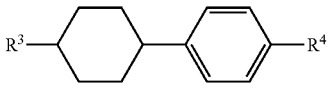

(2-3)

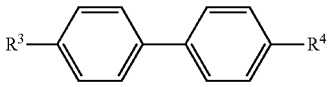

(2-4)

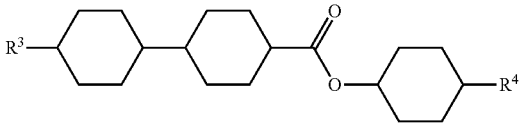

(2-5)

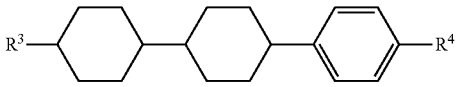

(2-6)

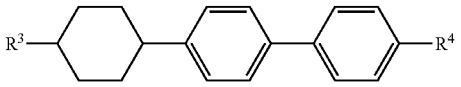

(2-7)

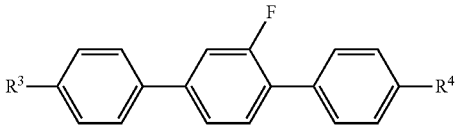

-continued (2-8)

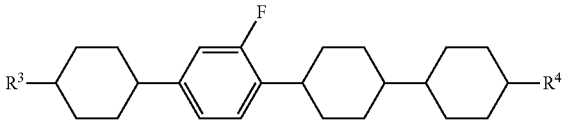

(2-9)

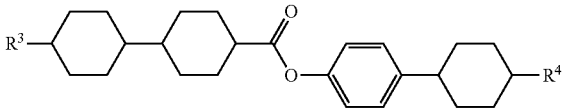

(2-10)

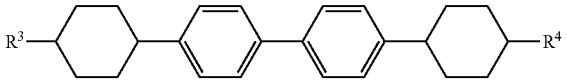

(2-11)

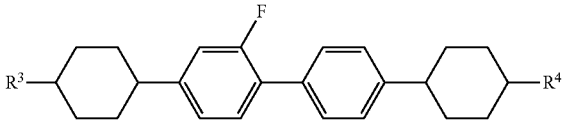

(2-12)

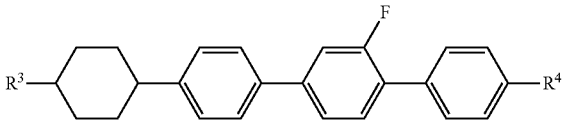

wherein $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.]

[4. The liquid crystal composition according to claim 1, wherein the third component is at least one compound selected from the group of compounds represented by formula (3-1) to formula (3-23):

(3-1)

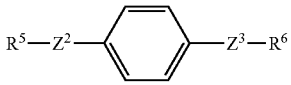

(3-2)

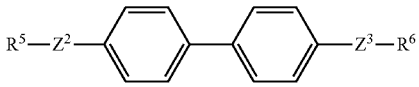

(3-3)

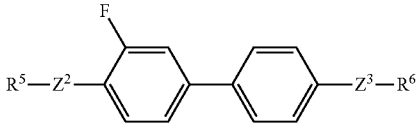

(3-4)

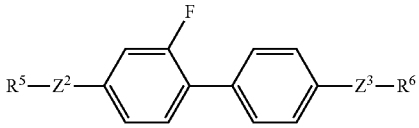

(3-5)

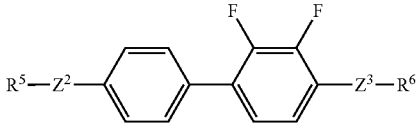

-continued (3-6)

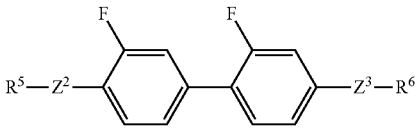

(3-7)

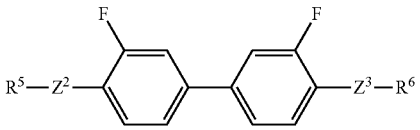

(3-8)

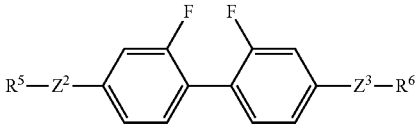

(3-9)

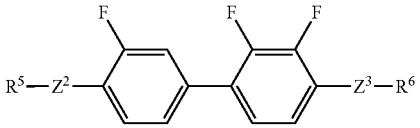

(3-10)

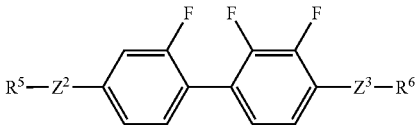

(3-11)

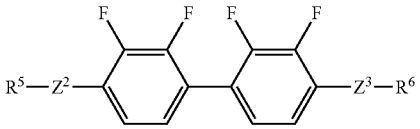

(3-12)

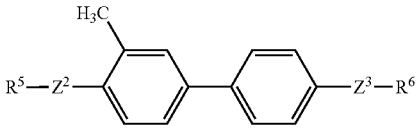

(3-13)

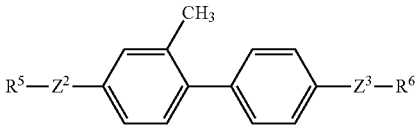

(3-14)

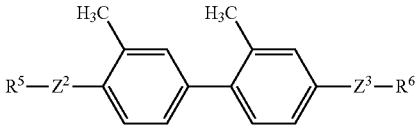

(3-15)

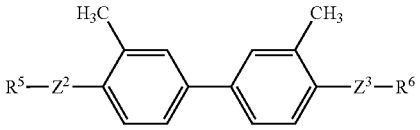

(3-16)

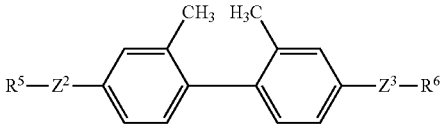

-continued (3-17)

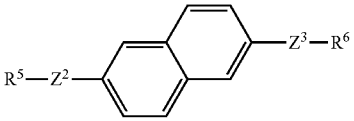

(3-18)

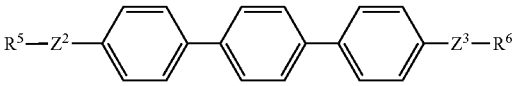

(3-19)

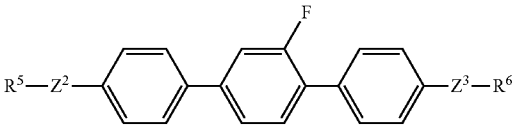

(3-20)

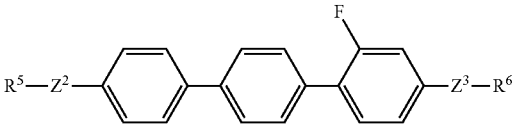

(3-21)

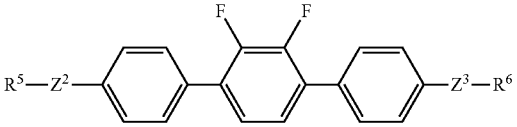

(3-22)

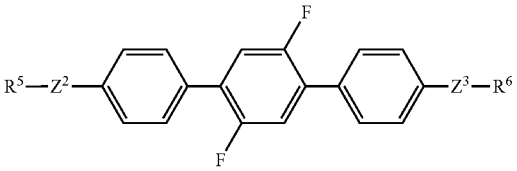

(3-23)

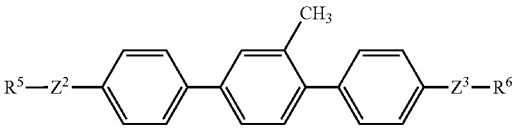

wherein $R^5$ and $R^6$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, acrylate, methacrylate, vinyloxy, propenylether, oxirane, oxetane or vinylketone, and at least one of $R^5$ and $R^6$ is acrylate, methacrylate, propenylether, oxirane, oxetane or vinylketone; and $Z^2$ and $Z^3$ are independently a single bond, alkylene having 1 to 12 carbons, or alkylene having 1 to 12 carbons in which arbitrary —$CH_2$— is replaced by —O—.]

[5. The liquid crystal composition according to claim 4, wherein the third component is at least one compound selected from the group of compounds represented by formula (3-2).]

[6. The liquid crystal composition according to claim 4, wherein the third component is at least one compound selected from the group of compounds represented by formula (3-3).]

[7. The liquid crystal composition according to claim 4, wherein the third component is at least one compound selected from the group of compounds represented by formula (3-4).]

[8. The liquid crystal composition according to claim 1, wherein a ratio of the first component is in the range of 10% by weight to 60% by weight, a ratio of the second component is in the range of 5% by weight to 50% by weight, based on the weight of the liquid crystal composition excluding the third component, and a ratio of the third component is in the range of 0.05 part by weight to 10 parts by weight, relative to 100 parts by weight of the liquid crystal composition excluding the third component.]

[9. The liquid crystal composition according to claim 1, further containing at least one compound selected from the group of compounds represented by formula (4-1) to formula (4-3) as a fourth component:

(4-1)

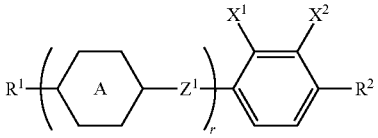

(4-2)

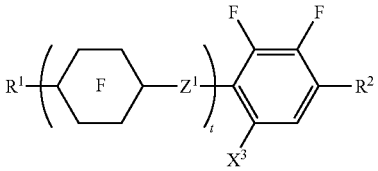

(4-3)

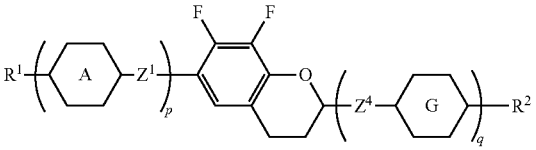

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring A and ring G are independently 1,4-cyclohexylene or 1,4-phenylene; ring F is independently tetrahydropyran-2,5-diyl, 1,4-cyclohexylene, 1,4-phenylene or 2,3-difluoro-1,4-phenylene; $Z^1$ and $Z^4$ are independently a single bond, ethylene, methyleneoxy or carbonyloxy; $X^1$ and $X^2$ are fluorine for either one or chlorine for the other one; $X^3$ is hydrogen or methyl, and when $X^3$ is hydrogen, at least one of ring F is tetrahydropyran-2,5-diyl or 2,3-difluoro-1,4-phenylene; r and t are independently 1, 2 or 3; and p and q are independently 0, 1, 2 or 3, and a sum of p and q is 3 or less.]

[10. The liquid crystal composition according to claim 9, wherein the fourth component is at least one compound selected from the group of compounds represented by formula (4-1-1) to formula (4-1-3), formula (4-2-1) to formula (4-2-15) and formula (4-3-1) to formula (4-3-4):

(4-1-1)

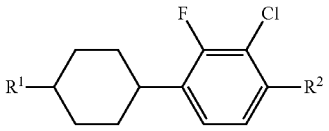

-continued (4-1-2)

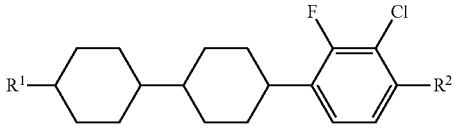

(4-1-3)

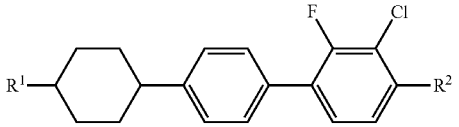

(4-2-1)

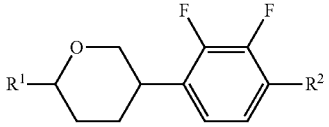

(4-2-2)

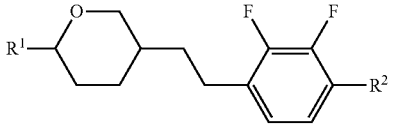

(4-2-3)

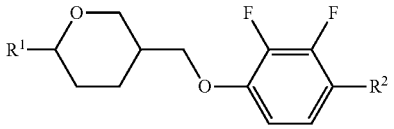

(4-2-4)

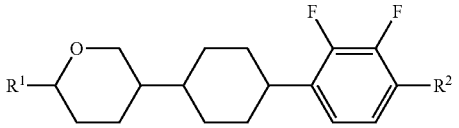

(4-2-5)

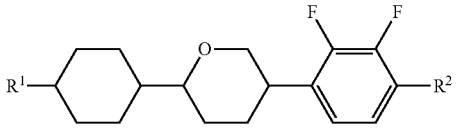

(4-2-6)

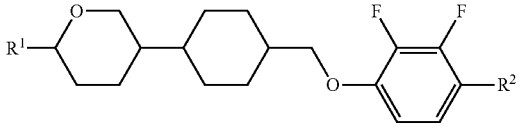

(4-2-7)

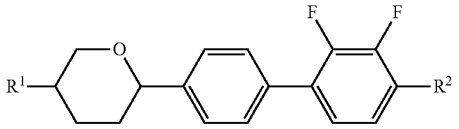

(4-2-8)

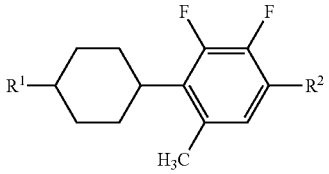

-continued (4-2-9)

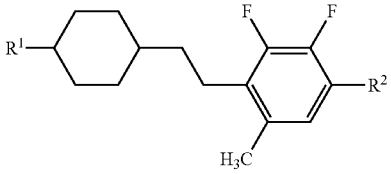

(4-2-10)

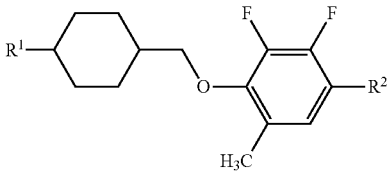

(4-2-11)

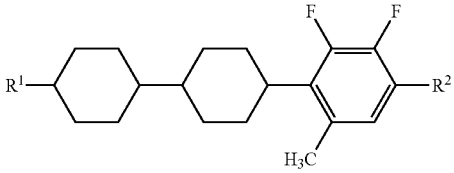

(4-2-12)

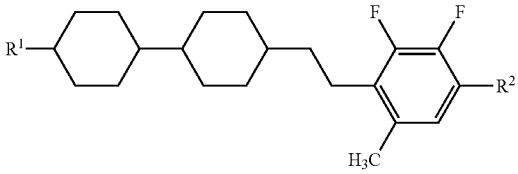

(4-2-13)

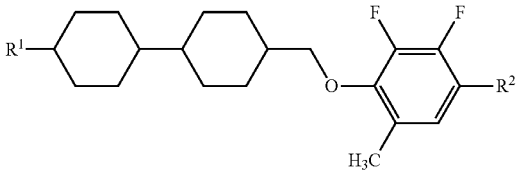

(4-2-14)

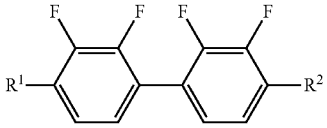

(4-2-15)

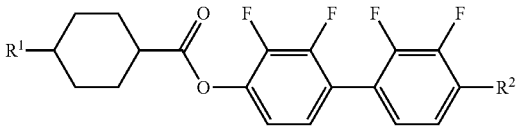

(4-3-1)

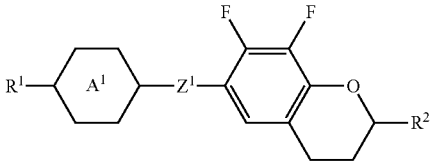

(4-3-2)

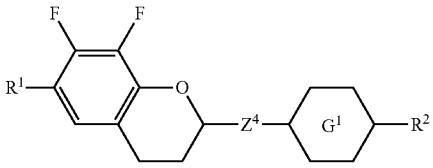

-continued (4-3-3)

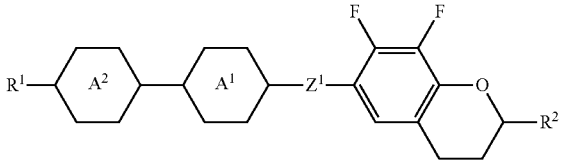

(4-3-4)

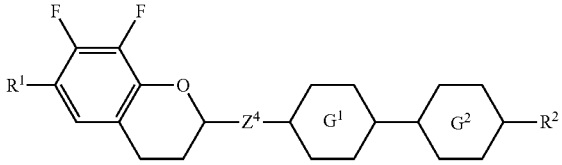

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring $A^1$, ring $A^2$, ring $G^1$ and ring $G^2$ are independently 1,4-cyclohexylene or 1,4-phenylene; and $Z^1$ and $Z^4$ are independently a single bond, ethylene, methyleneoxy or carbonyloxy.]

[11. The liquid crystal composition according to claim 1, further containing a polymerization initiator.]

[12. The liquid crystal composition according to claim 1, further containing a polymerization inhibitor.]

[13. The liquid crystal composition according to claim 1, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.]

[14. A liquid crystal display device, containing the liquid crystal composition according to claim 1.]

[15. The liquid crystal display device according to claim 14, wherein an operating mode in the liquid crystal display device is a VA mode, an IPS mode or a PSA mode, and a driving mode in the liquid crystal display device is an active matrix mode.]

[16. The liquid crystal composition according to claim 2, wherein the second component further comprises at least one compound selected from the group of compounds represented by formula (2-1) to formula (2-12) other than the compounds 2-HH-3 and V-HH-3:

(2-1)

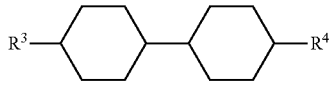

(2-2)

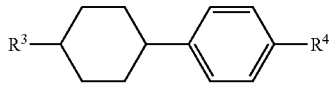

(2-3)

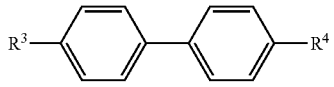

(2-4)

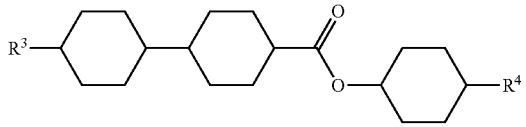

-continued (2-5)

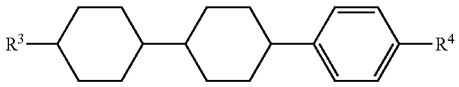

(2-6)

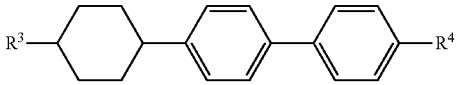

(2-7)

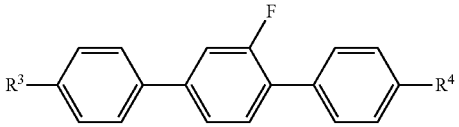

(2-8)

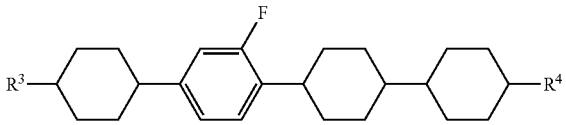

(2-9)

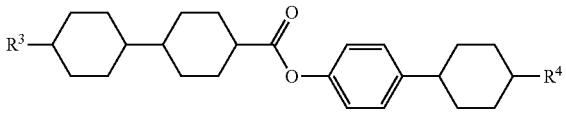

(2-10)

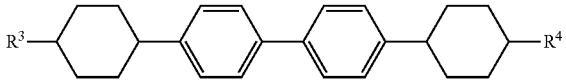

(2-11)

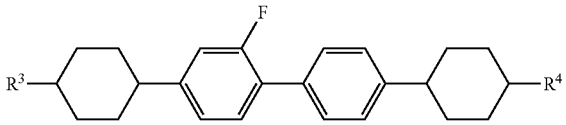

(2-12)

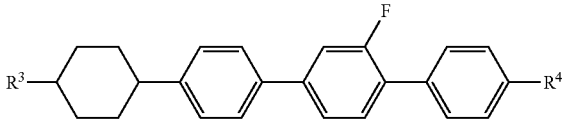

wherein $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.]

[17. The liquid crystal composition according to claim 16, wherein the third component is at least one compound selected from the group of compounds represented by formula (3-1) to formula (3-23):

(3-1)

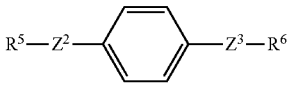

(3-2)

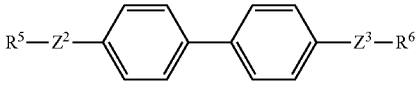

-continued (3-3)

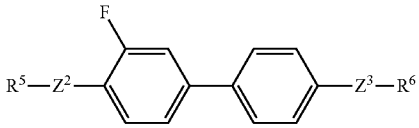

(3-4)

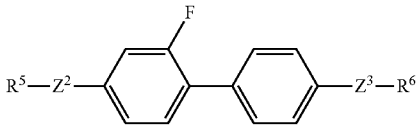

(3-5)

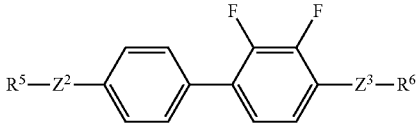

(3-6)

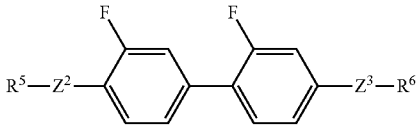

(3-7)

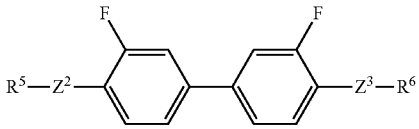

(3-8)

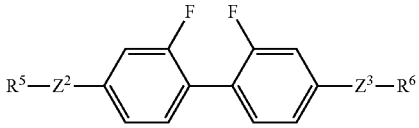

(3-9)

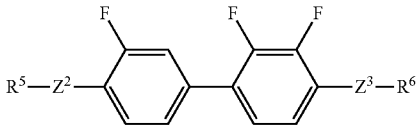

(3-10)

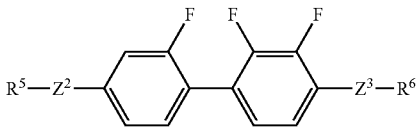

(3-11)

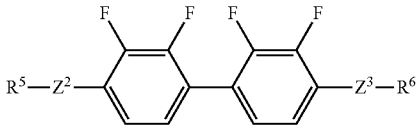

(3-12)

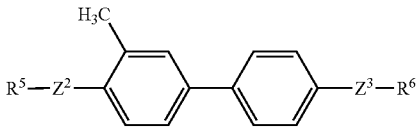

(3-13)

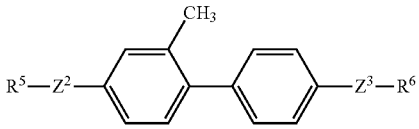

-continued (3-14)

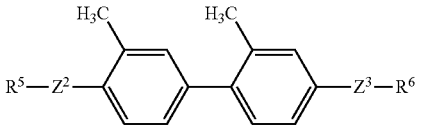

(3-15)

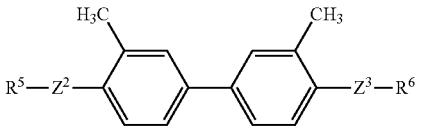

(3-16)

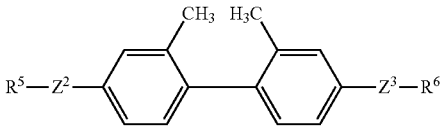

(3-17)

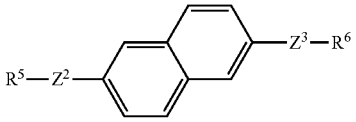

(3-18)

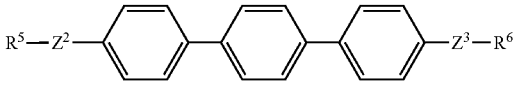

(3-19)

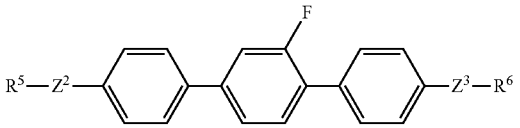

(3-20)

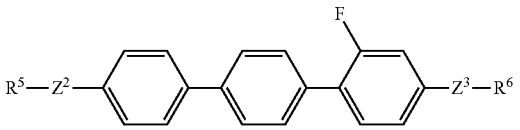

(3-21)

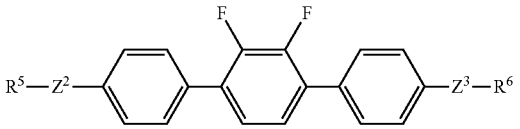

(3-22)

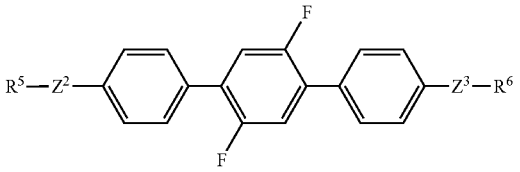

(3-23)

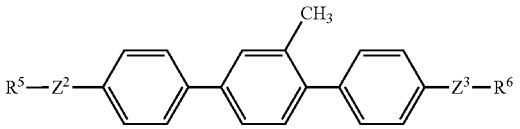

wherein $R^5$ and $R^6$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, acrylate, methacrylate, vinyloxy, propenylether, oxirane, oxetane or vinylketone, and at least one of $R^5$ and $R^6$ is acrylate, methacrylate, propenylether, oxirane, oxetane or vinylketone; and $Z^2$ and $Z^3$ are independently a single bond, alkylene having 1 to 12 carbons, or alkylene having 1 to 12 carbons in which arbitrary —$CH_2$— is replaced by —O—.]

[18. The liquid crystal composition according to claim 17, wherein the third component is at least one compound selected from the group of compounds represented by formula (3-2).]

[19. The liquid crystal composition according to claim 17, wherein the third component is at least one compound selected from the group of compounds represented by formula (3-3).]

[20. The liquid crystal composition according to claim 17, wherein the third component is at least one compound selected from the group of compounds represented by formula (3-4).]

*21. A liquid crystal composition, containing at least one compound selected from the group of compounds represented by formula (1) as a first component, at least one compound selected from the group of compounds represented by formula (2) as a second component and at least one compound selected from the group of compounds represented by formula (3) as a third component:*

(1)

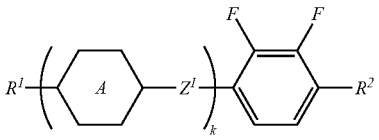

(2)

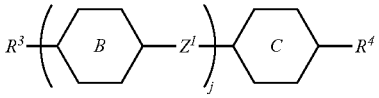

(3)

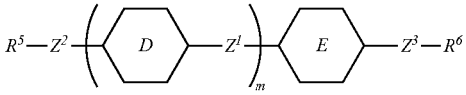

*wherein $R^1$, $R^2$, $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; $R^5$ and $R^6$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, acrylate, methacrylate, vinyloxy, propenylether, oxirane, oxetane or vinylketone, and at least one of $R^5$ and $R^6$ is acrylate, methacrylate, propenylether, oxirane, oxetane or vinylketone; ring A is independently 1,4-cyclohexylene or 1,4-phenylene; ring B and ring C are independently 1,4-cyclohexylene, 1,4-phenylene, 2-fluoro-1,4-phenylene, 3-fluoro-1,4-phenylene or 2,5-difluoro-1,4-phenylene; ring D and ring E are independently 1,4-cyclohexylene, 1,4-phenylene, 2-fluoro-1,4-phenylene, 3-fluoro-1,4-phenylene, 2,3-difluoro-1,4-phenylene, 2,5-difluoro-1,4-phenylene, 3,5-difluoro-1,4-phenylene, 2-methyl-1,4-phenylene, 3-methyl-1,4-phenylene or 2,6-naphthalene; $Z^1$ is independently a single bond, ethylene, methyleneoxy or carbonyloxy; $Z^2$ and $Z^3$ are independently a single bond, alkylene having 1 to 12 carbons, or alkylene having 1 to 12 carbons in which arbitrary —$CH_2$— is replaced by —O—; k is 1, 2 or 3; j is 1; and m is 0, 1 or 2,*

*wherein the at least one compound as the first component is a compound 3-HB(2F,3F)-O2 shown below:*

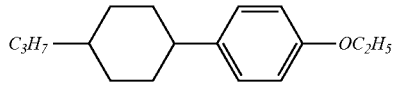

*3-HB(2F,3F)-O2, and wherein the at least one compound as the second component comprises arbitrary one of compounds 2-HH-3 and V-HH-3 shown below:*

*2-HH-3*

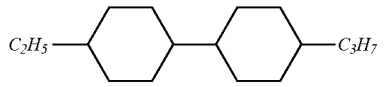

*V-HH-3*

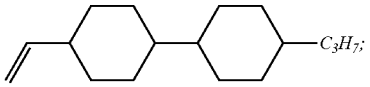

*wherein the at least one compound as the second component is V-HH-3:*

*V-HH-3*

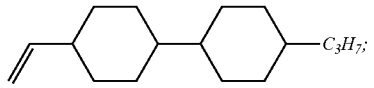

*and*

*wherein the ratio of V-HH-3 is at least 20% by weight.*

*22. The liquid crystal composition according to claim 21, wherein the first component is at least one compound selected from the group of compounds represented by formula (1-1) to formula (1-7):*

*(1-1)*

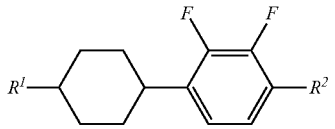

*(1-2)*

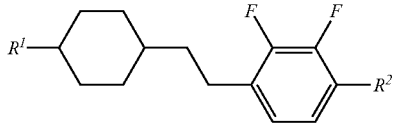

*(1-3)*

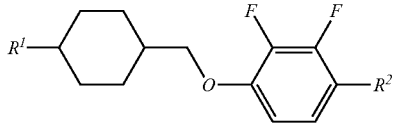

*(1-4)*

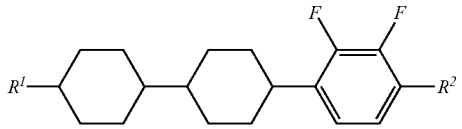

*-continued*

*(1-5)*

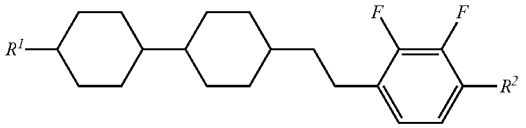

*(1-6)*

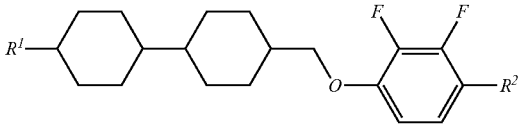

*(1-7)*

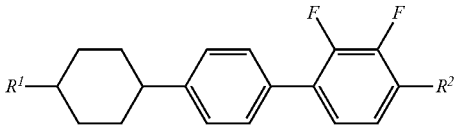

*wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.*

*23. The liquid crystal composition according to claim 21, wherein $R^2$ is alkoxy having 1 to 12 carbons.*

*24. The liquid crystal composition according to claim 21, wherein the second component further comprises at least one compound selected from the group of compounds represented by formula (2-1) to formula (2-3) other than the compound V-HH-3:*

*(2-1)*

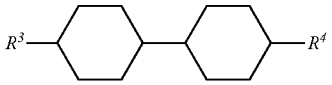

*(2-2)*

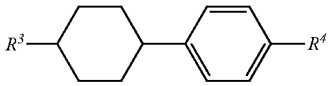

*(2-3)*

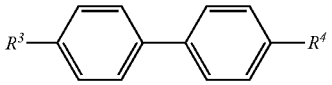

*wherein $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine.*

*25. The liquid crystal composition according to claim 21, wherein the third component is at least one compound selected from the group of compounds represented by formula (3-1) to formula (3-23):*

*(3-1)*

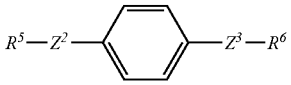

*-continued*
(3-2)
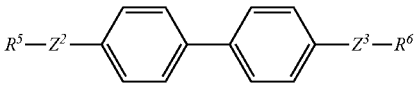
(3-3)
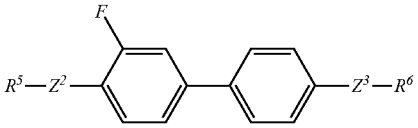
(3-4)
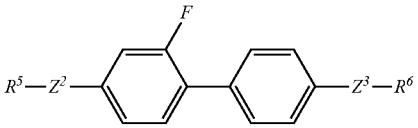
(3-5)
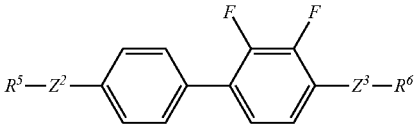
(3-6)
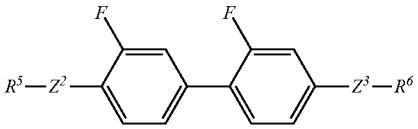
(3-7)
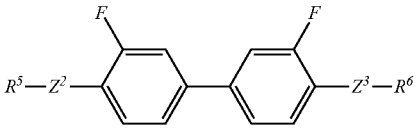
(3-8)
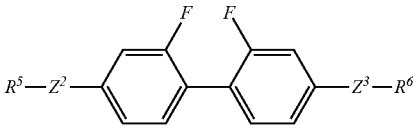
(3-9)
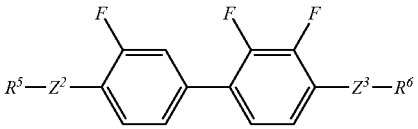
(3-10)
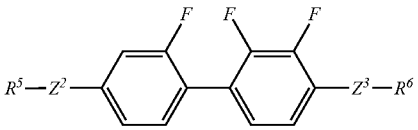
(3-11)
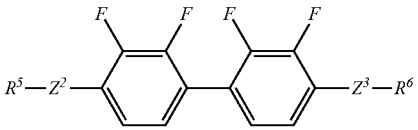
(3-12)
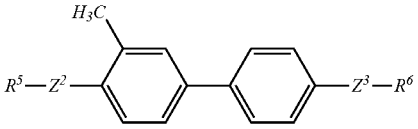
*-continued*
(3-13)
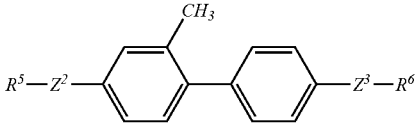
(3-14)
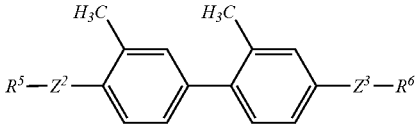
(3-15)
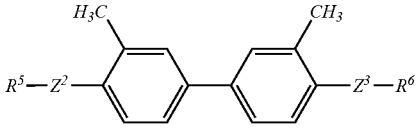
(3-16)
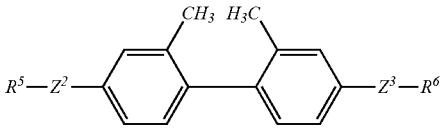
(3-17)
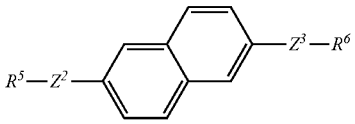
(3-18)
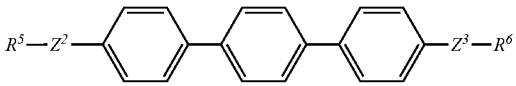
(3-19)
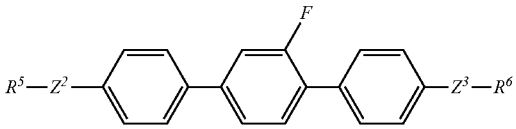
(3-20)
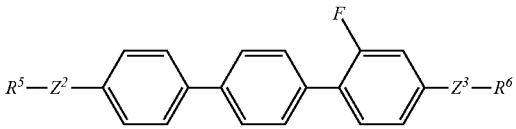
(3-21)
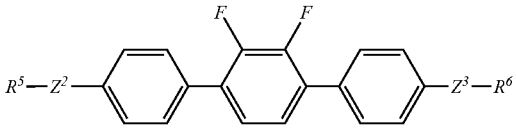
(3-22)
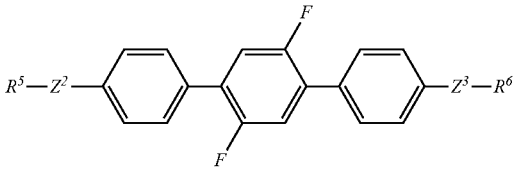

*-continued*

(3-23)

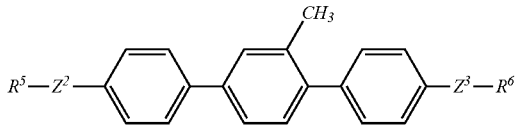

*wherein $R^5$ and $R^6$ are independently alkyl having 1 to 12 carbons, alkoxy having 1 to 12 carbons or alkenyl having 2 to 12 carbons, or alkenvl having 2 to 12 carbons in which arbitrary hydrogen is replaced by fluorine, acrylate, methacrylate, propenylether, oxirane, oxetane or vinylketone, and at least one of $R^5$ and $R^6$ is acrylate, methacrylate, propenylether, oxirane, oxetane or vinylketone; and $Z^2$ and $Z^3$ are independently a single bond, alkylene having 1 to 12 carbons, or alkylene having 1 to 12 carbons in which arbitrary —$CH_2$— is replaced by —O—.*

*26. The liquid crystal composition according to claim 25, wherein the third component is at least one compound selected from the group of compounds represented by formula (3-2).*

*27. The liquid crystal composition according to claim 21, wherein the third component is at least one compound selected from the group of compounds represented by formula (3-1) to formula (3-23):*

(3-1)

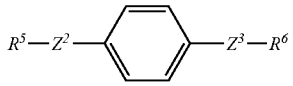

(3-2)

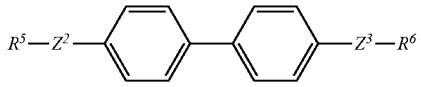

(3-3)

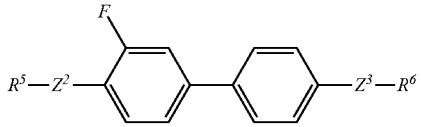

(3-4)

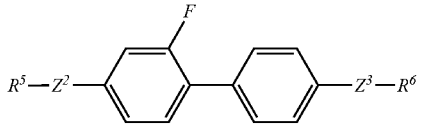

(3-5)

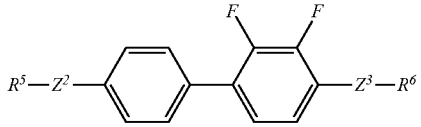

(3-6)

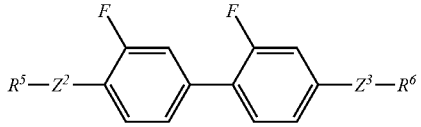

(3-7)

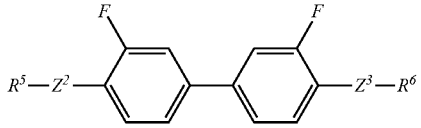

*-continued*

(3-8)

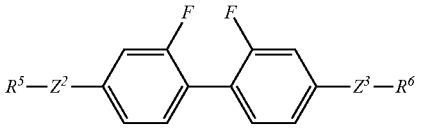

(3-9)

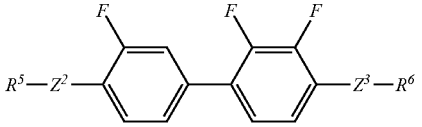

(3-10)

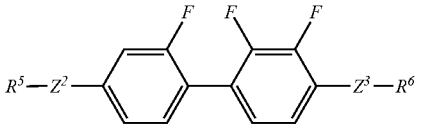

(3-11)

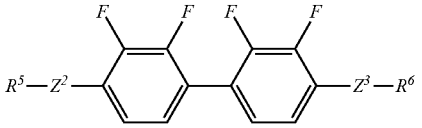

(3-12)

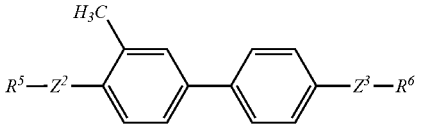

(3-13)

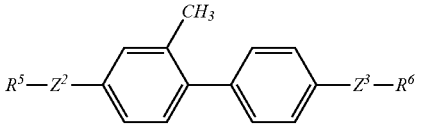

(3-14)

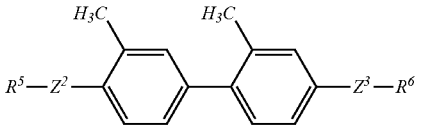

(3-15)

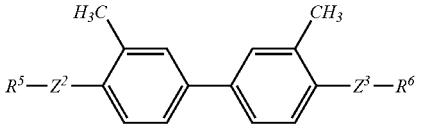

(3-16)

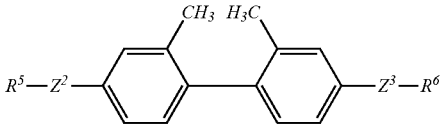

(3-17)

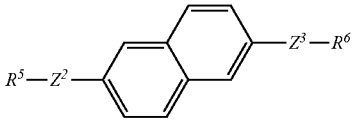

(3-18)

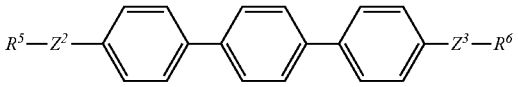

-continued (3-19)

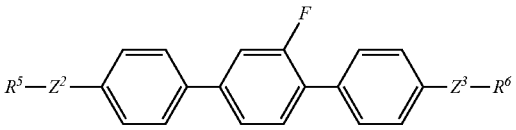

(3-20)

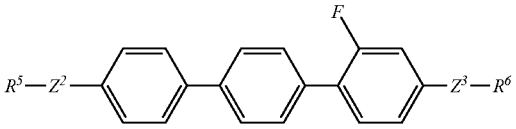

(3-21)

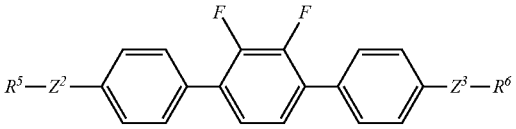

(3-22)

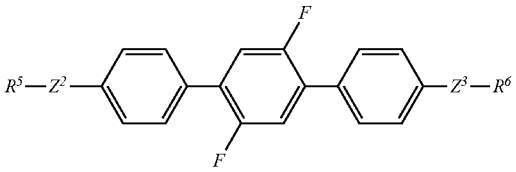

(3-23)

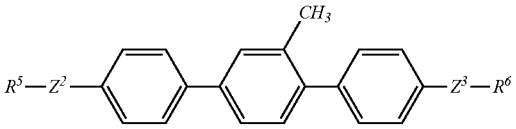

*wherein $R^5$ and $R^6$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine, acrylate, methacrylate, propenylether, oxirane, oxetane or vinylketone, and at least one of $R^5$ and $R^6$ is methacrylate; and $Z^2$ and $Z^3$ are independently a single bond, alkylene having 1 to 12 carbons, or alkylene having 1 to 12 carbons in which arbitrary —$CH_2$— is replaced by —O—.*

*28. The liquid crystal composition according to claim 21, wherein a ratio of the first component is in the range of 10% by weight to 60% by weight, a ratio of the second component is in the range of 20% by weight to 50% by weight, based on the weight of the liquid crystal composition excluding the third component, and a ratio of the third component is in the range of 0.05 part by weight to 10 parts by weight, relative to 100 parts by weight of the liquid crystal composition excluding the third component.*

*29. The liquid crystal composition according to claim 21, further containing at least one compound selected from the group of compounds represented by formula (4-1) to formula (4-3) as a fourth component:*

(4-1)

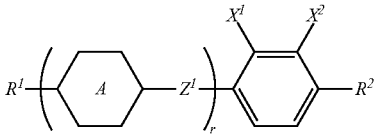

(4-2)

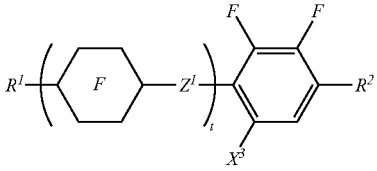

(4-3)

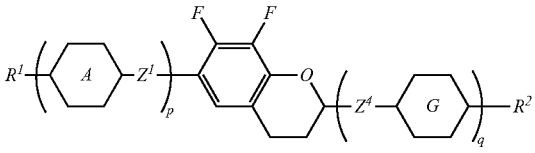

*wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring A and ring G are independently 1,4-cyclohexylene or 1,4-phenylene; ring F is independently tetrahydropyran-2,5-diyl, 1,4-cyclohexylene, 1,4-phenylene or 2,3-difluoro-1,4-phenylene; $Z^1$ and $Z^4$ are independently a single bond, ethylene, methyleneoxy or carbonyloxy; $X^1$ and $X^2$ are fluorine or chlorine, wherein one is fluorine, the other is chlorine; $X^3$ is hydrogen or methyl, and when $X^3$ is hydrogen, at least one of ring F is tetrahydropyran-2,5-diyl or 2,3-difluoro-1,4-phenylene; r and t are independently 1, 2 or 3; and p and q are independently 0, 1, 2 or 3, and a sum of p and q is 3 or less.*

*30. The liquid crystal composition according to claim 29, wherein the fourth component is at least one compound selected from the group of compounds represented by formula (4-1-1) to formula (4-1-3), formula (4-2-1) to formula (4-2-15) and formula (4-3-1) to formula (4-3-4):*

(4-1-1)

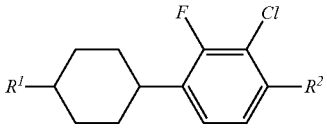

(4-1-2)

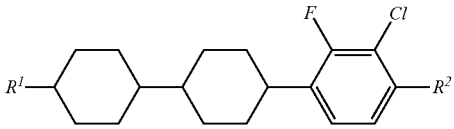

(4-1-3)

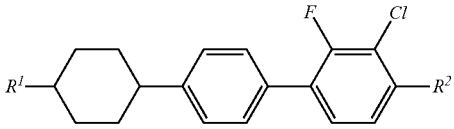

*-continued*
(4-2-1)
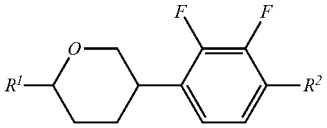
(4-2-2)
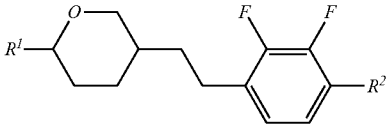
(4-2-3)
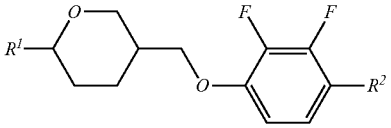
(4-2-4)
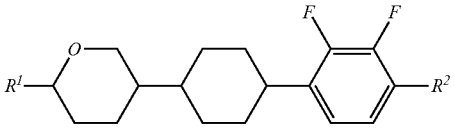
(4-2-5)
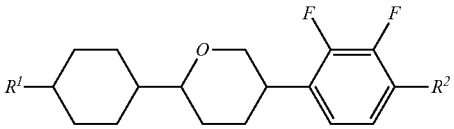
(4-2-6)
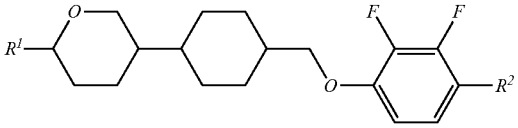
(4-2-7)
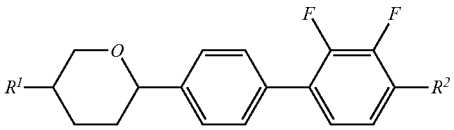
(4-2-8)
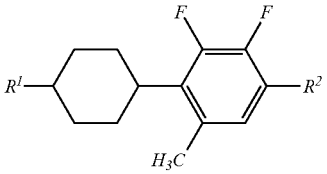
(4-2-9)
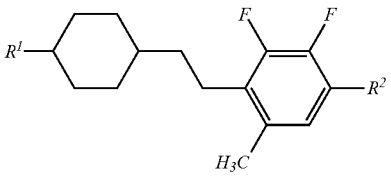
(4-2-10)
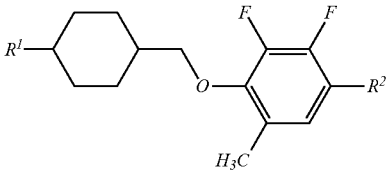
*-continued*
(4-2-11)
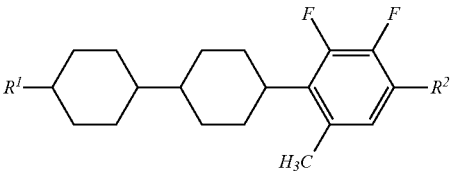
(4-2-12)
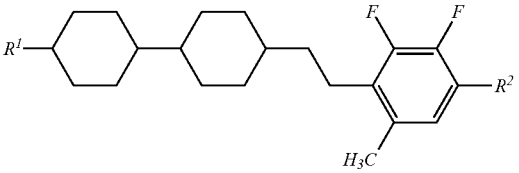
(4-2-13)
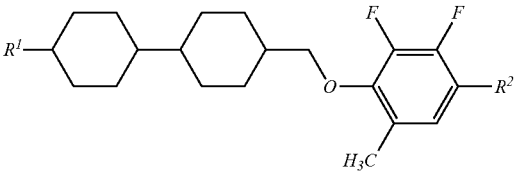
(4-2-14)
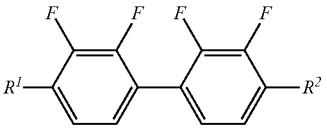
(4-2-15)
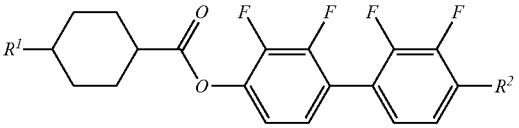
(4-3-1)
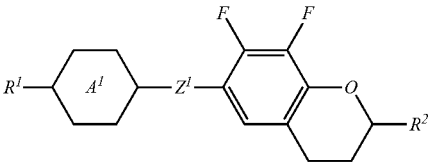
(4-3-2)
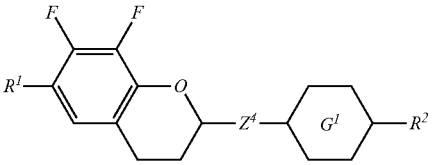
(4-3-3)
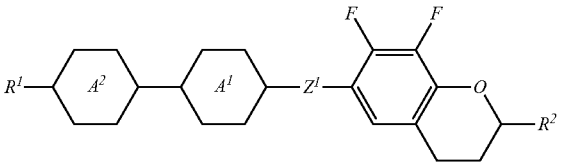

*-continued*

(4-3-4)

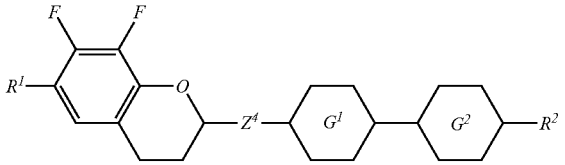

*wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; ring $A^1$, ring $A^2$, ring $G^1$ and ring $G^2$ are independently 1,4-cyclohexylene or 1,4-phenylene; and $Z^1$ and $Z^4$ are independently a single bond, ethylene, methyleneoxy or carbonyloxy.*

*31. The liquid crystal composition according to claim 21, further containing a polymerization initiator.*

*32. The liquid crystal composition according to claim 21, further containing a polymerization inhibitor.*

*33. The liquid crystal composition according to claim 21, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is −2 or less.*

*34. A liquid crystal display device comprising the liquid crystal composition according to claim 21, wherein an operating mode in the liquid crystal display device is a PSA mode, and a driving mode in the liquid crystal display device is an active matrix mode.*

* * * * *